(12) United States Patent
Seem

(10) Patent No.: US 7,729,882 B2
(45) Date of Patent: *Jun. 1, 2010

(54) METHOD AND SYSTEM FOR ASSESSING PERFORMANCE OF CONTROL SYSTEMS

(75) Inventor: John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/363,562

(22) Filed: Jan. 30, 2009

(65) Prior Publication Data

US 2009/0144023 A1 Jun. 4, 2009

Related U.S. Application Data

(63) Continuation of application No. 11/698,256, filed on Jan. 25, 2007, now Pat. No. 7,496,472.

(51) Int. Cl.
G06F 17/18 (2006.01)
(52) U.S. Cl. ............... 702/181; 702/179; 702/182; 700/276
(58) Field of Classification Search ......... 702/179–183, 702/81, 94, 113, 189, 199; 700/32, 276
See application file for complete search history.

(56) References Cited

U.S. PATENT DOCUMENTS

| | | | |
|---|---|---|---|
| 5,355,305 A | | 10/1994 | Seem et al. |
| 5,414,640 A | | 5/1995 | Seem |
| 5,506,768 A | | 4/1996 | Seem et al. |
| 5,555,195 A | | 9/1996 | Jensen et al. |
| 5,566,092 A | * | 10/1996 | Wang et al. ............ 702/185 |
| 5,568,377 A | | 10/1996 | Seem et al. |
| 5,590,830 A | | 1/1997 | Kettler et al. |
| 5,682,329 A | * | 10/1997 | Seem et al. ............ 700/276 |
| 5,791,408 A | | 8/1998 | Seem |
| 5,867,384 A | | 2/1999 | Drees et al. |
| 6,006,142 A | * | 12/1999 | Seem et al. ............ 700/276 |

(Continued)

FOREIGN PATENT DOCUMENTS

SU 535103 A 11/1976

(Continued)

OTHER PUBLICATIONS

Schein et al., "Fault Detection & Diagnostics for AHUs and VAV Boxes", ASHRAE Journal, Jul. 2005, pp. 58-63, American Society of Heating, Refrigerating and Air-Conditioning Engineers, Inc., vol. 47, No. 7.

(Continued)

*Primary Examiner*—Eliseo Ramos Feliciano
*Assistant Examiner*—Mi'schita' Henson
(74) *Attorney, Agent, or Firm*—Foley & Lardner LLP

(57) ABSTRACT

A system is disclosed for scaling performance indicators of control applications in an environmental control system. The system is configured to identify a probability distribution that is characteristic of a fault-free environmental control system and to use the probability distribution of a fault-free environmental control system in calculations to display probability distributions of data from first and second control applications on a common scale.

23 Claims, 18 Drawing Sheets

U.S. PATENT DOCUMENTS

| | | | |
|---|---|---|---|
| 6,122,605 | A | 9/2000 | Drees et al. |
| 6,219,590 | B1 | 4/2001 | Bernaden, III et al. |
| 6,223,544 | B1 | 5/2001 | Seem |
| 6,265,843 | B1 | 7/2001 | West et al. |
| 6,296,193 | B1 | 10/2001 | West et al. |
| 6,369,716 | B1 | 4/2002 | Abbas et al. |
| 6,389,331 | B1 | 5/2002 | Jensen et al. |
| 6,408,228 | B1 | 6/2002 | Seem et al. |
| 6,415,617 | B1 | 7/2002 | Seem |
| 6,477,439 | B1 | 11/2002 | Bernaden, III et al. |
| 6,594,554 | B1 | 7/2003 | Seem et al. |
| 6,816,811 | B2 | 11/2004 | Seem |
| 6,862,540 | B1 | 3/2005 | Welch et al. |
| 6,937,909 | B2 | 8/2005 | Seem |
| 7,031,880 | B1 | 4/2006 | Seem et al. |
| 7,124,637 | B2 | 10/2006 | Singhal et al. |
| 7,496,472 | B2 | 2/2009 | Seem |
| 2006/0058898 | A1* | 3/2006 | Emigholz et al. ............ 700/29 |
| 2006/0090467 | A1 | 5/2006 | Crow |
| 2006/0259285 | A1 | 11/2006 | Bahel et al. |
| 2008/0180929 | A1 | 7/2008 | Leigh et al. |
| 2008/0182367 | A1 | 7/2008 | Petti |

FOREIGN PATENT DOCUMENTS

| | | |
|---|---|---|
| WO | WO 00/68744 A1 | 11/2000 |
| WO | WO 2009/012269 A2 | 1/2009 |

OTHER PUBLICATIONS

Seem et al., "On-Line Monitoring and Fault Detection of Control System and Performance", presented at the CLIMA 2000 meeting, Brussels, Belgium, Aug. 30-Sep. 2, 1997, pp. 1-20.

Seem et al., "On-Line Monitoring and Fault Detection", ASHRAE Journal, Jul. 1999, pp. 21-26, American Society of Heating, Refrigerating and Air-Conditioning Engineers, Inc.

Keynote Data Accuracy and Statistical Analysis for Performance Trending and Service Level Management: A Keynote White Paper, Keynote Systems California, Jan. 25, 2002, pp. 6-10.

International Search Report and Written Opinion for International Patent Application No. PCT/US2008/070091, mailed Sep. 30, 2009, 13 pages.

* cited by examiner

METHOD AND SYSTEM FOR ASSESSING PERFORMANCE OF CONTROL SYSTEMS

CROSS-REFERENCE TO RELATED PATENT APPLICATIONS

This application is a continuation of U.S. application Ser. No. 11/698,256 filed Jan. 25, 2007, incorporated herein by reference in its entirety. This application incorporates by reference U.S. patent application Ser. No. 10/841,107, filed on May 7, 2004, now U.S. Pat. No. 7,031,880.

FIELD

The present application relates to a control system. More particularly, the present application relates to a method and apparatus for assessing performance of environmental control networks. The present application also relates to a method and apparatus for comparing performance problems in environmental control systems with staged-control outputs versus proportional outputs.

BACKGROUND

Environmental control systems or facility management systems are employed in office buildings, manufacturing facilities, and other similar buildings, for controlling the internal environment of the facility. The environmental control system may be employed to control temperature, fluid flow, humidity, lighting, boilers, chillers, power, security and similar systems in the internal environment.

For example, in environmental control networks configured to control temperature and air flow, controlled air units such as variable air volume (VAV) boxes and unitary devices (UNT) are preferably located throughout the facility to provide environmentally controlled air to the internal environment. The controlled air is preferably provided at a particular temperature or humidity so that a comfortable internal environment is established and maintained.

The VAV boxes and unitary devices are typically coupled via duct work to a source of conditioned air, known as an air handling unit (AHU). VAV boxes and unitary devices may include a fan or other device for blowing the controlled air. VAV boxes and unitary devices may also include a damper for regulating the amount of the controlled air provided to the internal environment. The damper may be coupled to an actuator, which preferably positions the damper so that appropriate air flow is provided to the internal environment.

In modern systems, a digital controller may typically be associated with at least one of the actuator and the damper. The controller receives information related to the air flow and temperature (known as "controlled variables") in the internal environment and appropriately positions the actuator so that the appropriate air flow is provided to the internal environment.

The AHU also includes a digital controller which may control the supply of cooled air by regulating the flow of chilled water through a cooling coil. The controller preferably regulates the flow of chilled water to the cooling coil by adjusting the position of a valve based on a feedback signal indicative of the temperature of the air discharged from the coil. The feedback signal is typically generated by a sensor disposed to monitor the controlled variable.

The AHU and VAV controllers use the feedback signals to maintain the controlled variables within certain tolerances of desired levels (known as "setpoints"). For example, the AHU controller attempts to maintain the temperature of the air discharged from the system at a specific level. When the actual temperature of the discharged air deviates from the desired temperature, the controller preferably appropriately adjusts the flow of the chilled water to bring the actual air temperature back in line with the desired air temperature. Thus, if the feedback signal indicates that the actual air temperature is colder than the desired temperature, the controller preferably decreases the flow rate of chilled water to cause the actual temperature of the discharged air to increase. Likewise, if the feedback signal indicates that the actual air temperature is warmer than the desired temperature, the controller preferably increases the flow rate of chilled water to cause the actual temperature of the discharged air to decrease.

An ideal feedback control system would be able to maintain the controlled variable at the setpoint based only on the feedback signal. However, actual feedback control systems may require additional inputs known as control parameters that are used by the controller to determine how to control the system based on the feedback signal and the setpoint. Common control algorithms that make use of such control parameters are proportional (P) control, proportional integral (PI) control, and proportional-integral derivative (PID) control.

With any of the foregoing feedback control strategies, however, it may be difficult to maintain the controlled variable precisely at the desired setpoint for various reasons, including that the appropriate values for the control parameters may change over time as the system is used. For example, the dynamics of a process may be altered by a heat exchanger fouling, an inherent nonlinear behavior, ambient variations, flow rate changes, large and frequent disturbances, and unusual operations status such as failures, startup and shutdown. The process of adjusting the control parameters of a controller to compensate for such system changes is called retuning. If a controller is not periodically retuned, the control response may become poor. For example, the controlled variable may become unstable or oscillate widely with respect to the setpoint. This can result in inefficient operation as well as increase the maintenance costs due to unnecessary wear of the components.

Monitoring the performance of environmental control systems and diagnosing problems therewith have been disclosed in commonly owned U.S. Pat. No. 5,555,195 ("the '195 patent"), U.S. Pat. No. 5,682,329 ("the '329 patent"), and U.S. Pat. No. 7,031,880 ("the '880 patent"). These patents disclose diagnostic systems that may be utilized to analyze the performance of devices in an environmental control system such as an HVAC or VAV box. The diagnostic systems disclosed in these patents advantageously record temperature, air flow, actuator position and other data used in the VAV controllers and generate associated performance indices such as exponentially weighted moving averages (EWMAs). The performance indices may be related to error values, process output values, actuator positions, changes in actuator positions, duty cycles of the actuators, or starts, stops and reversals of the actuators. The calculated and stored performance indices allow building operators to analyze the VAV boxes and controller performance during particular time periods (e.g., commissioning) as well as during the useful lifetimes of the systems.

In addition to monitoring and diagnostic systems such as described above, it is also known to provide alarm/warning systems and data visualization programs to assist building operators with deriving meaningful information from the data that is gathered. However, human operators must typically select the thresholds for alarms and warnings, which may be a daunting task. If the thresholds are too tight, numerous false alarms may be issued. Conversely, if the thresholds are too loose, equipment or system failures can go undetected.

Additionally, it is also known to perform a statistical scaling on performance indicators. As disclosed in the '880 patent, the performance indicators may be received by a system for one or more control applications. The units of the performance indicators are preferably converted into consistent for each type of control application. Subsequently, the units are preferably normalized based on the equipment size. Upon standardizing and normalizing the performance indices, a statistical scaling is performed. A known method for performing such statistical scaling involves determining the standard deviation (z-value) for each performance index. However, the statistical scaling method finds less utility in control systems that use on-off control or staged control outputs.

In view of the foregoing, it would be desirable to provide an improved method and apparatus for conveying measured performance indices to building operators. It would be further desirable to be able to convey and compare performance indicators for control systems with staged-control outputs and proportional outputs on the same scale.

SUMMARY

The present application relates to a method and apparatus for assessing performance of an environmental control network. The present application also relates to a method and apparatus for diagnosing performance problems in environmental control networks.

An embodiment relates to a method for scaling performance indicators of control applications in an environmental control system. The method includes receiving more than one performance indicator from a first control application, wherein the first control application includes a modulating control output and receiving more than one performance indicator from a second control application, wherein the second control application includes a staged-control output. The method further includes identifying a probability distribution, wherein the probability distribution is characteristic of a fault-free environmental control system and calculating probability distributions associated with the performance indicators of the first and second control applications. The method also includes displaying the probability distributions of the first and second control applications on a common scale.

These and other benefits and features of embodiments will be apparent upon consideration of the following detailed description of exemplary embodiments thereof, presented in connection with the following drawings in which like reference numerals are used to identify like elements throughout.

DETAILED DESCRIPTION

Figure 1:
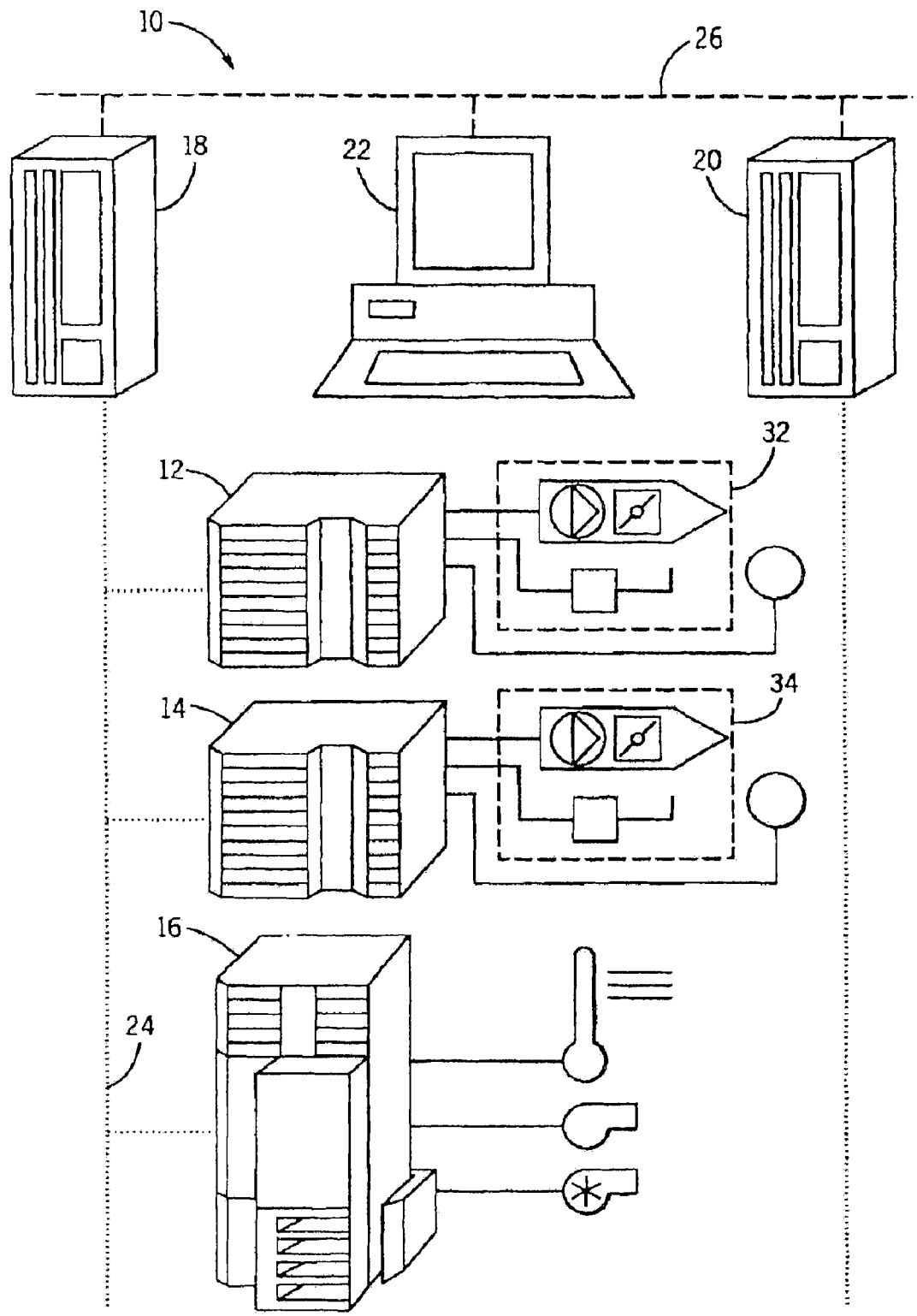
FIG. 1 is a schematic block diagram of an environmental control network.
Figure 3:
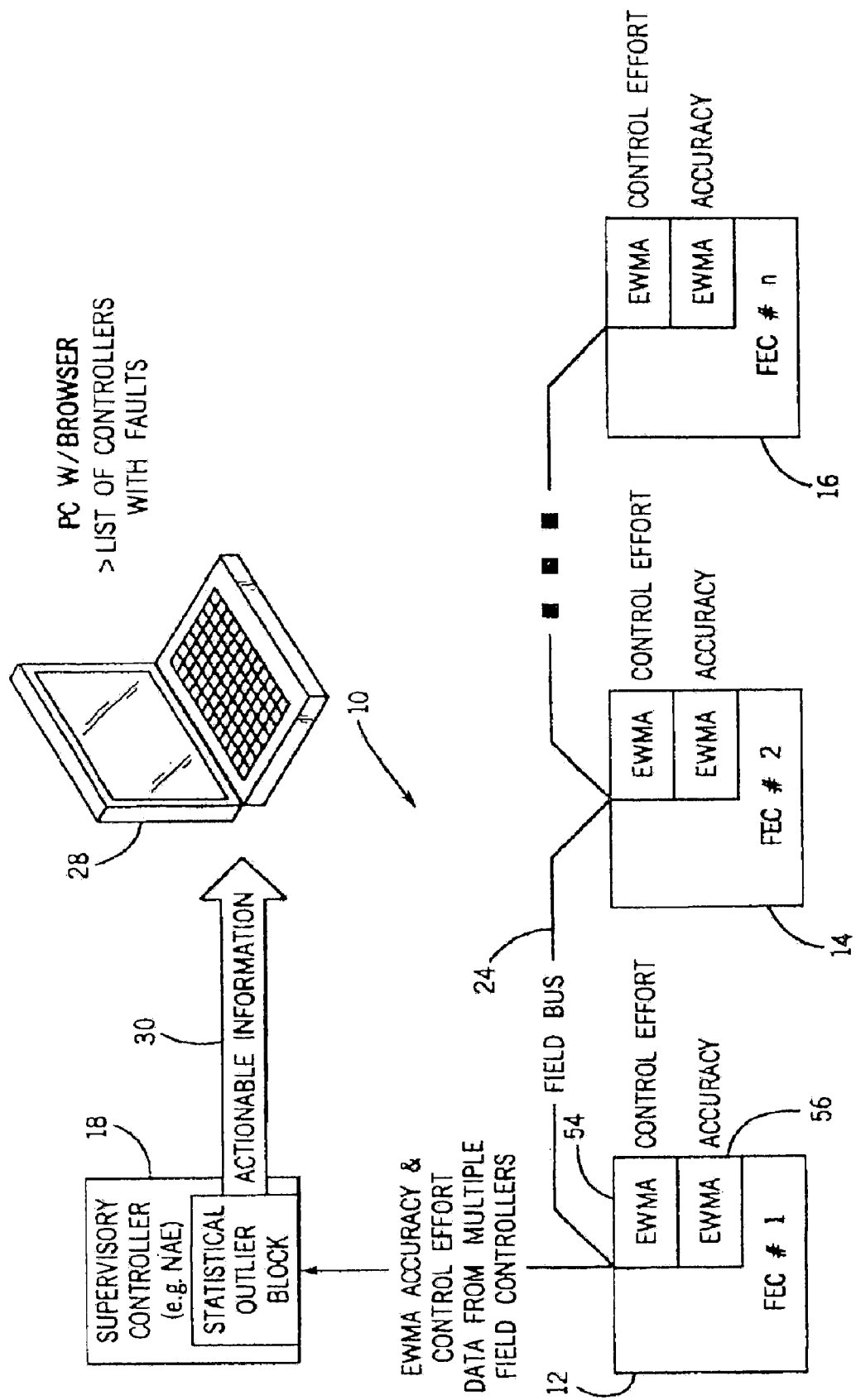
FIG. 3 is simplified schematic block diagram of an environmental control network and a remote computer in communication therewith.

Referring to FIG. 1, an environment control system or network 10 includes a plurality of field controllers 12, 14 and 16, a pair of supervisory controllers 18 and 20, and a work station 22. Field controllers 12, 14 and 16 may be coupled to each other and to supervisory controller 18 for communication via a communication bus 24. Supervisory controller 18 may also be coupled to work station 22 as well as to controller 20 or other controllers in environment control network 10 via a communications trunk 26. As shown in FIG. 3, a portable or remote computer 28 may also be coupled to supervisory controller 18, to another controller or server on network 10, and/or to one or more devices on the subnetworks of network 10, via a session connection 30. Session connection 30 may be provided via a local area network (LAN) connection, a remote Internet, VPN connection, etc.

Referring again to FIG. 1, environment control network 10 may be a facilities management system such as the Metasys™ system as manufactured by Johnson Controls, Inc. (JCI). In the illustrated embodiment, field controllers 12 and 14 are associated with VAV boxes 32 and 34 and field controller 16 is associated with an air handler unit (not shown) that provides forced air for the facility. Examples of field bus controllers that may be suitable for use in network 10 include FEC, AHU, VAV, UNT and VMA controllers manufactured by JCI. Examples of supervisory controllers that may be suitable for use in network 10 include NCE, NAE, NIE and NCM controllers manufactured by JCI. Examples of communications buses or trunks that may be suitable for use in network 10 include Ethernet, LON, N1, N2, BACnet and MSTP. Persons skilled in the art will recognize that many other types of controllers and communication buses could be utilized in the exemplary embodiments.

According to one exemplary embodiment, each of field controllers 12, 14 and 16 gathers and stores information associated with operation of the controlled devices. Each field controller 12, 14 and 16 may also calculate performance indices (or indicators) for the controlled devices and/or the applications controlling such devices. Performance indicators are attributes of facility components (e.g. buildings, systems, and devices) that measure some aspect of the quality of operation of these components. In general, performance indicators have the following properties: 1. Provide a measure of the quality of the operation of a component, process or system. 2. Capable of being summarized or aggregated in some way. 3. Allow for comparison and summarization among disparate components. 4. May be compared against past performance or benchmarks.

Thus, a performance indicator provides some measure of whether a control application is performing as required. For example, an HVAC control loop controlling some HVAC process variable such as temperature or pressure is designed to maintain the process variable at a setpoint with minimal effort. Good performance indicators for this process might measure the deviation of input (i.e., the process variable) from setpoint (i.e., accuracy) as well as the size (i.e., magnitude, amount or degree) of control effort, which may be indicative of efficiency and/or mechanical wear.

Figure 2:
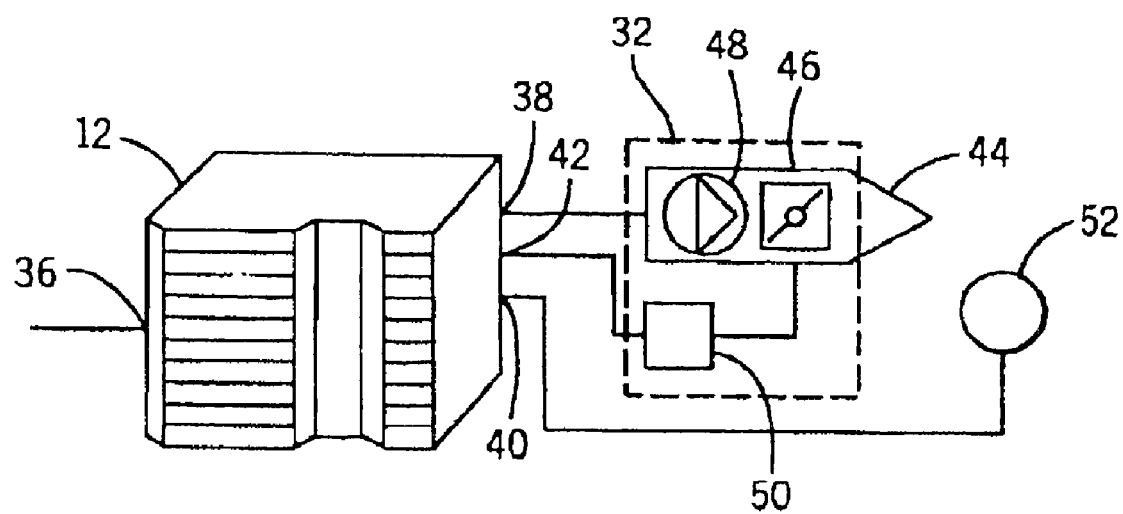
FIG. 2 is an enlarged schematic block diagram of a controller and associated air handling unit shown in FIG. 1.

With reference now to FIG. 2, additional details are provided for an exemplary controller and associated VAV box (e.g., controller 12 VAV box 32) that are suitable for use in the exemplary embodiments. In the illustrated embodiment, controller 12 includes a communication port 36 coupled with communication bus 24 (FIG. 1). Controller 12 also includes an airflow input 38, a temperature input 40, and an actuator output 42. Instead of VAV box 32, the controlled device could be an AHU including fans, heating or cooling units, exhaust dampers, and return dampers for treating an air flow 44.

In the illustrated embodiment, VAV control box 32 includes a damper 46, an air flow sensor 48, and an actuator 50. Actuator 50 positions damper 46 based on control signals from controller 12 provided via actuator output 42. The position of damper 46 controls the amount of air flow 44 provided to the environment being controlled. The controlled environment may be a room, hallway, building, a portion thereof, or any other internal environment. Air flow sensor 48 provides a parameter such as an air flow measurement to air flow input 38 of controller 12. The air flow measurement represents an estimate of the amount of air flow 44 provided through damper 46 to the controlled environment. A temperature sensor 52 located in the controlled environment provides another parameter to controller 12 via temperature input 40.

Additional details regarding controller 12 and its manner of operation are provided in commonly owned U.S. Pat. No. 5,682,329, which is also incorporated by reference. However, a brief summary of certain aspects of the operation of controller 12 are repeated below for convenience. Further details regarding the operation of network 10 are also provided in the '329 patent.

In the embodiment of FIGS. 1 and 2, controller 12 is configured to appropriately position actuator 50 in accordance with a control algorithm. The control algorithm may be a type that is well known to persons skilled in the art such as P, PI, PID based algorithms. The control algorithm may also be a PRAC based algorithm such as disclosed in commonly owned U.S. patent application Ser. No. 10/612,621 (now U.S. Pat. No. 6,937,909). In accordance with any of these types of algorithms, controller 12 may receive air flow and temperature feedback values at inputs 38 and 40, respectively. The control algorithm may also receive other data (e.g., temperature set point from a thermostat) from communications port 36 or some other input. Controller 12 provides an actuator output signal at actuator output 42 to accurately position damper 46 in an effort to maintain the controlled environment within a specified tolerance of the desired temperature with minimal effort.

In accordance with the foregoing control algorithms, controller 12 may also calculate and store one or more diagnostic and/or performance indices. The calculation of exemplary performance indices by controller 12 is described in the '329 patent, which was incorporated by reference above. Exemplary performance indices may include parameters such as the absolute value error for temperature, pressure, airflow or humidity. Exemplary performance indices may also include the actual temperature measured by temperature sensor 52 or air flow measured by sensor 48, the change in the actuator position signal, the temperature setpoint provided by the thermostat, the duty cycle or run time of actuator 50, or the number of starts, stops and reversals of actuator 50. In addition to the foregoing, many other types of performance indicators could be generated by controller 12, depending on the type of equipment being controlled, the environment being controlled and other factors.

In the embodiment illustrated in FIG. 3, controller 12 may calculate weighted averages of control effort and accuracy performance indicators 54 and 56. Performance indicators 54 and 56 may be exponentially weighted moving averages (EWMAs) such as described in the '329 patent. The calculated EWMA values 54 and 56 may be utilized in a variety of control and diagnostic systems including chemical applications, flight control, energy systems, lighting systems, and other environments. The use of EWMA values (as opposed to only the raw sensor readings) provides certain advantages including that only one previous value must be stored for each performance indicator. Additional advantages of using EWMA values include that they are based on all of the values in the time series, while at the same time being computationally efficient and giving greater weight to more recent values compared to older values.

Controller 12 may store the summary data, the performance indicators and/or the EWMA values in a local memory. Alternatively, or in addition, controller 12 may provide such information to supervisory controller 18 and/or to one or more remote computers 28 (or to any other computer or device on network 10 or that is capable of connecting to network 10) on a continuous, periodic, or on request only basis. This may be done for various purposes such as report generation, data logging, performance monitoring, diagnostics, and the like.

With reference now to FIGS. 4-7, a performance assessment and diagnostics display 58 for a facility management system is provided according to a first exemplary embodiment. Performance display 58 allows an operator to view the summary data, performance indices, EWMA values, and other types of operational data. As explained in detail below, the display of such information may be used to assess the current performance of the facility management system, to detect problems with performance, to diagnose the root causes of the problems, and so on. Significantly, such performance assessment and diagnosis may be accomplished according to the exemplary embodiments without requiring the operator to set any alarm or warning thresholds.

Figure 4:
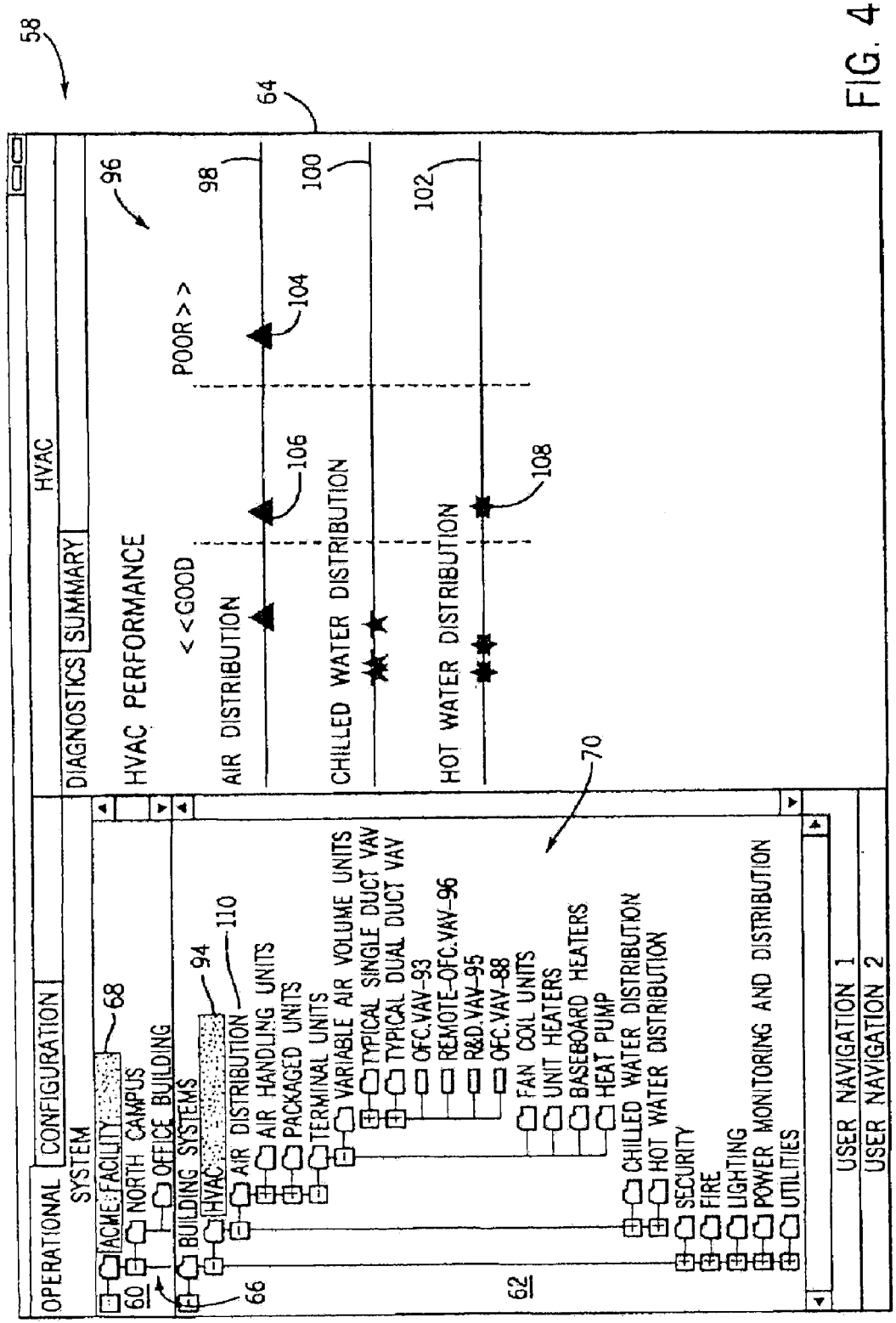
FIGS. 4-7 illustrate a first embodiment of a performance assessment and diagnostics display showing varying levels of detail of performance indicators associated with controlled devices in an environmental control network.

As shown in FIG. 4, performance display 58 comprises three main sections or windows including a facility navigation window 60 (in the upper left), a systems navigation window 62 (in the lower left), and a performance/diagnostics window 64 (on the right). Facility navigation window 60 displays a facility navigation tree 66 that allows an operator to select which of the different facilities and/or subfacilities (e.g., buildings or groups of buildings) of an organization will have its performance assessed and/or diagnosed. In the illustrated embodiment, a root node 68 (labeled "ACME Facility") of facility tree 66 has been selected. As a result of this selection, all of the facilities and subfacilities of ACME Facility 68 are available in systems navigation window 62.

Systems navigation window 62 includes a systems navigation tree 70 that allows an operator to select which of the different systems or subsystems (e.g., equipment, controlled devices, control applications, etc.) of the selected facilities or subfacilities are included in performance/diagnostics window 64. In the embodiment of FIG. 4, a node 94 (labeled "HVAC") of systems tree 70 has been selected. The act of selecting HVAC node 94 in window 62 causes an HVAC performance view 96 to appear in performance/diagnostics window 64.

In FIG. 4, HVAC performance view 96 provides a high level (i.e., summarized or "rolled-up") view of the performance indicators associated with the selected HVAC systems. According to an exemplary embodiment, HVAC performance view 96 comprises a plurality of "dot plots" graphs of the performance indices for the selected HVAC systems. For example, HVAC performance view 96 may include a dot plot graph for each type of control loop used in the HVAC systems of ACME Facility 68. In the illustrated example, view 96 displays an air distribution dot plot 98, a chilled water distribution dot plot 100, and a hot water distribution dot plot 102. That is, dot plots 98, 100 and 102 in FIG. 4 display performance indicators associated with the current level of performance for the air distribution, chilled water distribution and hot water distribution control loops in the HVAC systems of ACME Facility 68.

Instead of dot plot graphs, HVAC performance view 96 could display the performance indices for the selected HVAC systems using other types of graphics such as histograms, box plots, and the like. Moreover, the performance indicators could be displayed using a textual based display such as a table with rows and columns of numbers or percentages, or by a combination of graphics and text.

In the illustrated example, dot plot 98 in view 96 indicates that two of the air distribution control loops (indicated by data plots 104 and 106) are currently experiencing something less than good performance, with data plot 104 indicating a control loop considered to be operating at a "poor" level. By contrast, dot plots 100 and 102 show that all of the chilled water distribution control loops and all but one of the hot water distribution control loops are currently exhibiting good performance. In dot plot 102, one hot water distribution control loop shown in summary view 96 appears to be experiencing somewhat degraded system performance (see data point 108).

According to an exemplary embodiment, summary view 96 is created by rolling-up the performance indicators for only the worst performing control loop or subsystem of the selected system. Thus, the performance indicators for control loops or subsystems that are performing better than the worst performing control loops or subsystems may not be shown in summary view 96. As persons skilled in the art will appreciate, this summary view allows building operators to quickly identify control loops or subsystems that are exhibiting degraded performance levels without being distracted by control loops or subsystems that are performing properly. Instead of displaying performance indicators for only the worst performing control loops or subsystems, a weighting function or some other technique may be utilized.

Whenever a control loop or subsystem is identified using summary view 96 as performing at a degraded level, system tree 70 can be used to delve further into the performance indices associated with the poorly performing control loop or subsystem to obtain additional information which may help to diagnose the root cause of the degraded performance.

In view 96, a building operator responsible for diagnosing problems in the HVAC systems of ACME Facility 68 will notice that the air handling unit represented by data plot 104 appears to be experiencing degraded performance. To find the reason for this poor performance, the building operator may select a node 110 (labeled "Air Distribution") in system tree 70 to obtain additional information on the air distribution units.

Figure 5:
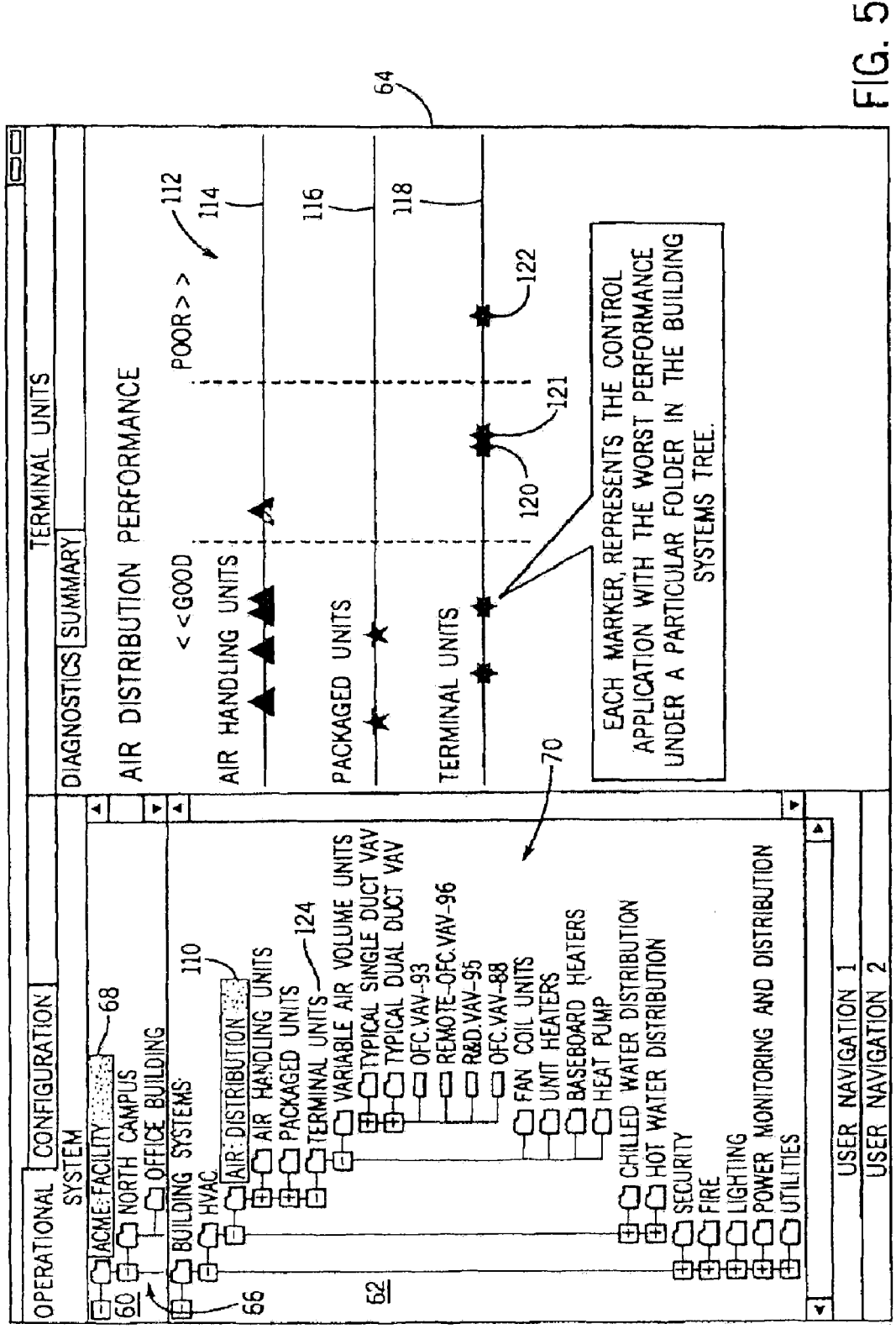

As shown in FIG. 5, the selection of node 110 in tree 70 causes an air distribution performance view 112 to appear in performance/diagnostics window 64. View 112 displays performance indices for all of the air distribution systems in ACME Facility 68 using dot plots graphs, one for each of type of air distribution system. For example, view 112 may display performance indices for air handling units, packaged units and terminal units in dot plots 114, 116 and 118, respectively.

From the performance indicators displayed in view 112, and particularly data points 120, 121 and 122 in dot plot 118, it can be seen that the poor air distribution performance first observed in summary view 96 (see data point 104 in FIG. 4) is associated with the terminal units rather than the air handling units or packaged units of the HVAC systems of in ACME Facility 68. Additional information for diagnosing the poor performance of the terminal unit(s) may be obtained by selecting a node 124 (labeled "Terminal Units") in system tree 70 of window 62.

Figure 6:
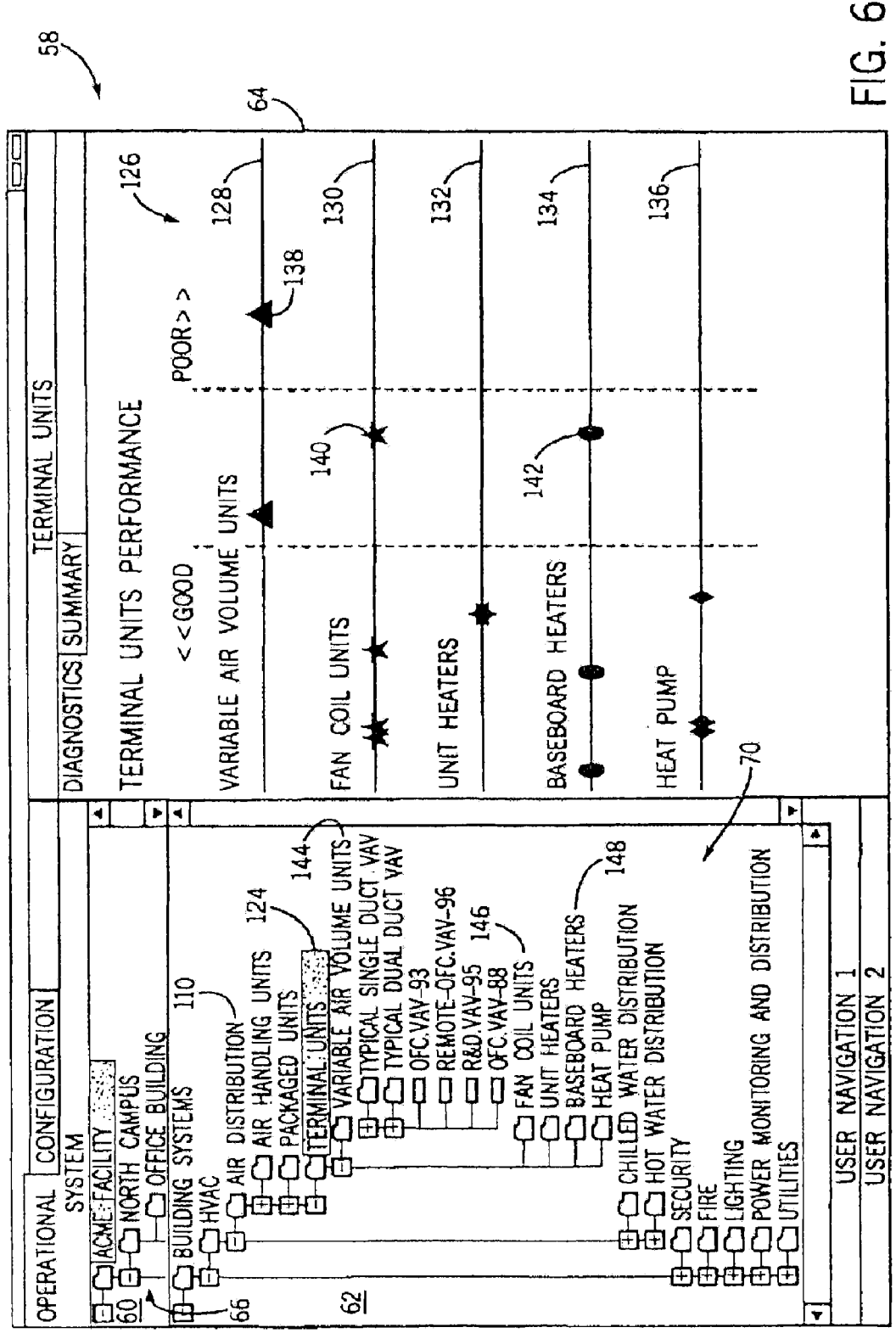

When node 124 is selected, a terminal units performance view 126 appears in performance/diagnostics window 64 as shown in FIG. 6. View 126 shows performance indicators for all of the terminal units in ACME Facility 68 using dot plots, one for each type of terminal unit in ACME Facility 68. In the illustrated embodiment, view 126 displays performance indices in dot plots 128, 130, 132, 134 and 136 corresponding to variable air volume units, fan coil units, unit heaters, baseboard heaters and heat pumps, respectively.

Figure 7:
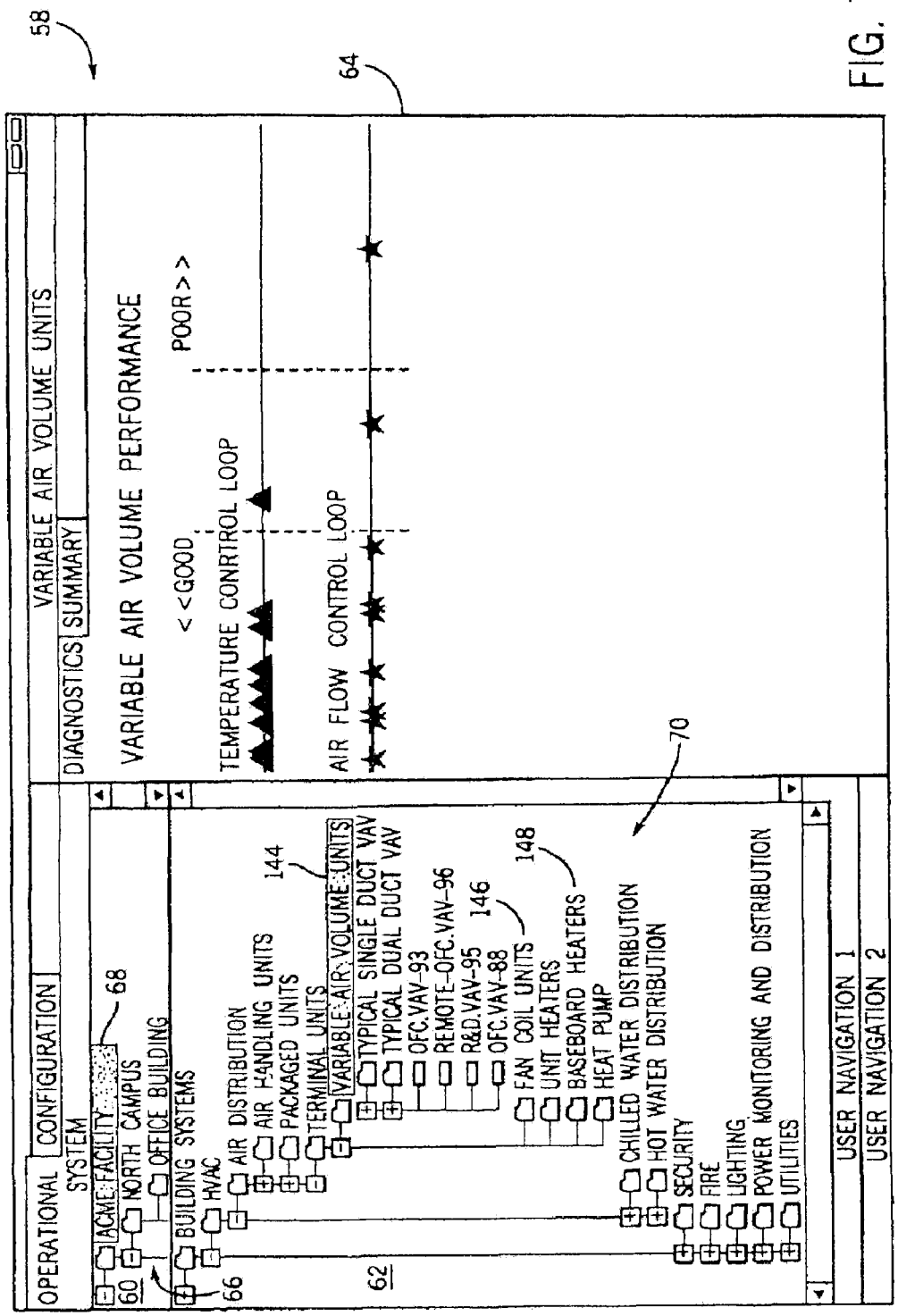
Figure 8:
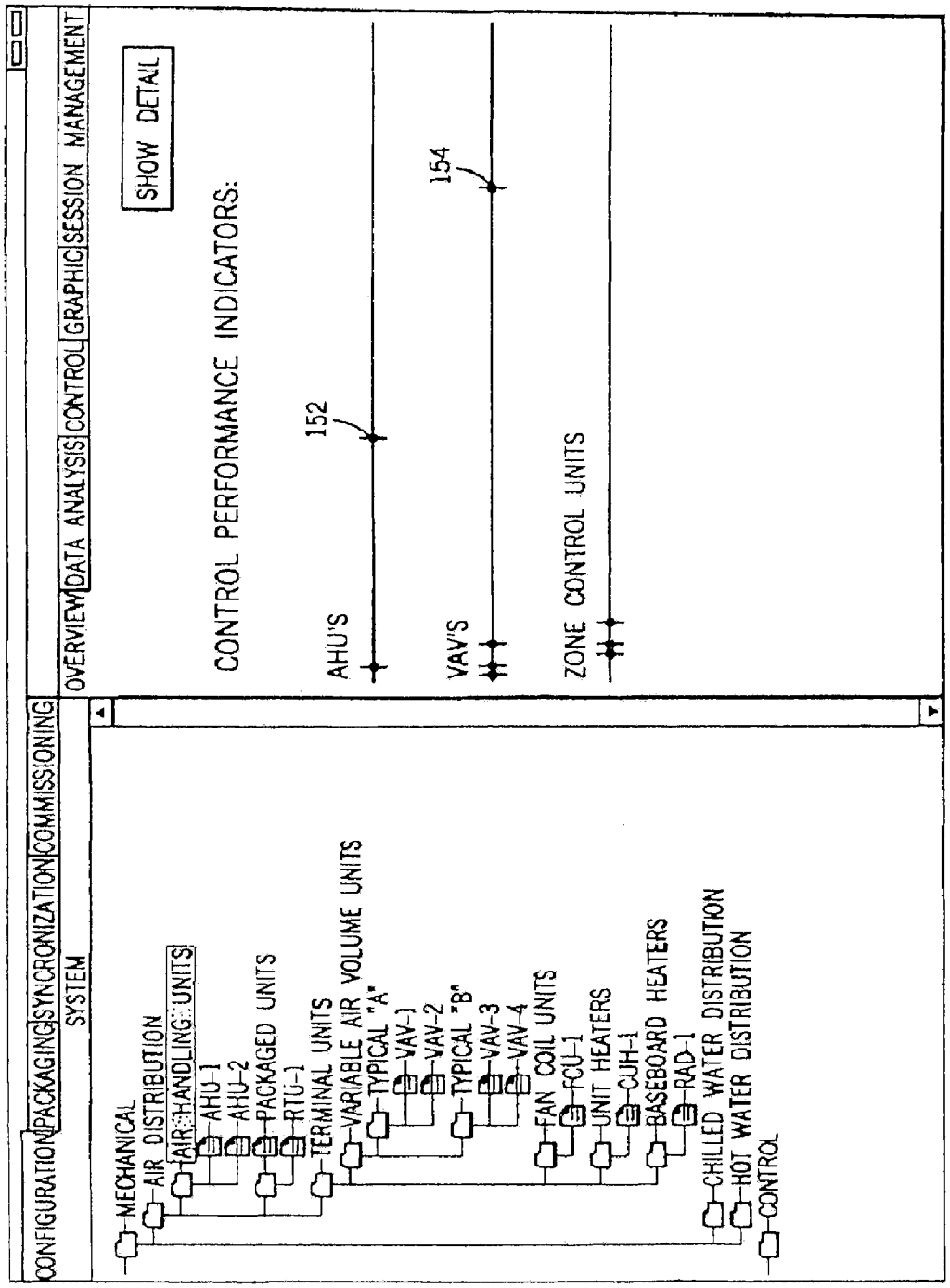
FIGS. 8-10 illustrate different reports displaying varying levels of detail of performance indicators associated with controlled devices in an environmental control network.

From the performance indicators displayed in view 126, and particularly dot plot 128, it can be seen that one of the variable air volume units (represented by data point 138) is experiencing particularly poor performance. Additional information regarding the degraded performance of this variable air volume unit indicated by data point 138 may be obtained by selecting a node 144 (labeled "Variable Air Volume Units") in system tree 70 of window 62 as shown in FIG. 7. Although not shown, nodes 146 and/or 148 can be selected to obtain additional information regarding the degraded fan coil unit performance and baseboard heater performance indicated by data points 140 and 142, respectively.

As persons skilled in the art will appreciate, the above-described embodiment of the present invention provides a new methodology for fault detection and diagnosis that overcomes many of the problems with traditional methods. Currently, fault detection is typically accomplished using alarm and event management systems that are based on limit sensing. Limit sensing raises alarms when observations cross predefined thresholds. After the alarm draws the operator's attention, the operator must typically find the root cause of the alarm without any further assistance from the alarm and event management system. Limit sensing is prevalent in current systems because it easy to implement and understand, however, it has limitations. For example, it can be difficult to set thresholds that minimize false alarms while still being sensitive to real faults. Moreover, certain kinds of faults tend to cascade alarms, making it more difficult for the operator to focus on the true root cause.

To further explain the methodology associated with the present invention, it is useful to identify the various stages in fault detection and diagnosis in building automation system monitoring. In general, there are three stages to fault detection and diagnosis in engineering systems: 1. Fault detection—determine that something has or is going wrong in the monitored system. 2. Fault isolation—determine the exact location of the fault (i.e., the faulty component(s) such as valve, damper, etc.). 3. Fault identification—determine the magnitude of the fault. The isolation and identification tasks together are referred to as fault diagnosis.

The methodology and framework of the exemplary embodiments described herein assists with the first three stages. In particular, the use of performance indicators automates stages 1 and 2. In addition, the standard user interface for organizations, navigations, performance indicator alarm reporting, and views provided by display 58 assists users with stages 3 and 4.

With reference now to FIGS. 8-12, a typical scenario for using another exemplary embodiment of the present invention for performance based commissioning and/or long term monitoring of an HVAC system will be described. Performance based commissioning and/or long term monitoring begins with an overview report 150 (see FIG. 8) that shows all of the systems that have been or are currently being assessed. That is, report 150 summarizes the performance of all systems that are being commissioned or monitored. Note that only certain systems are identified as poor performers (as indicated by data points 152 and 154).

Figure 9:
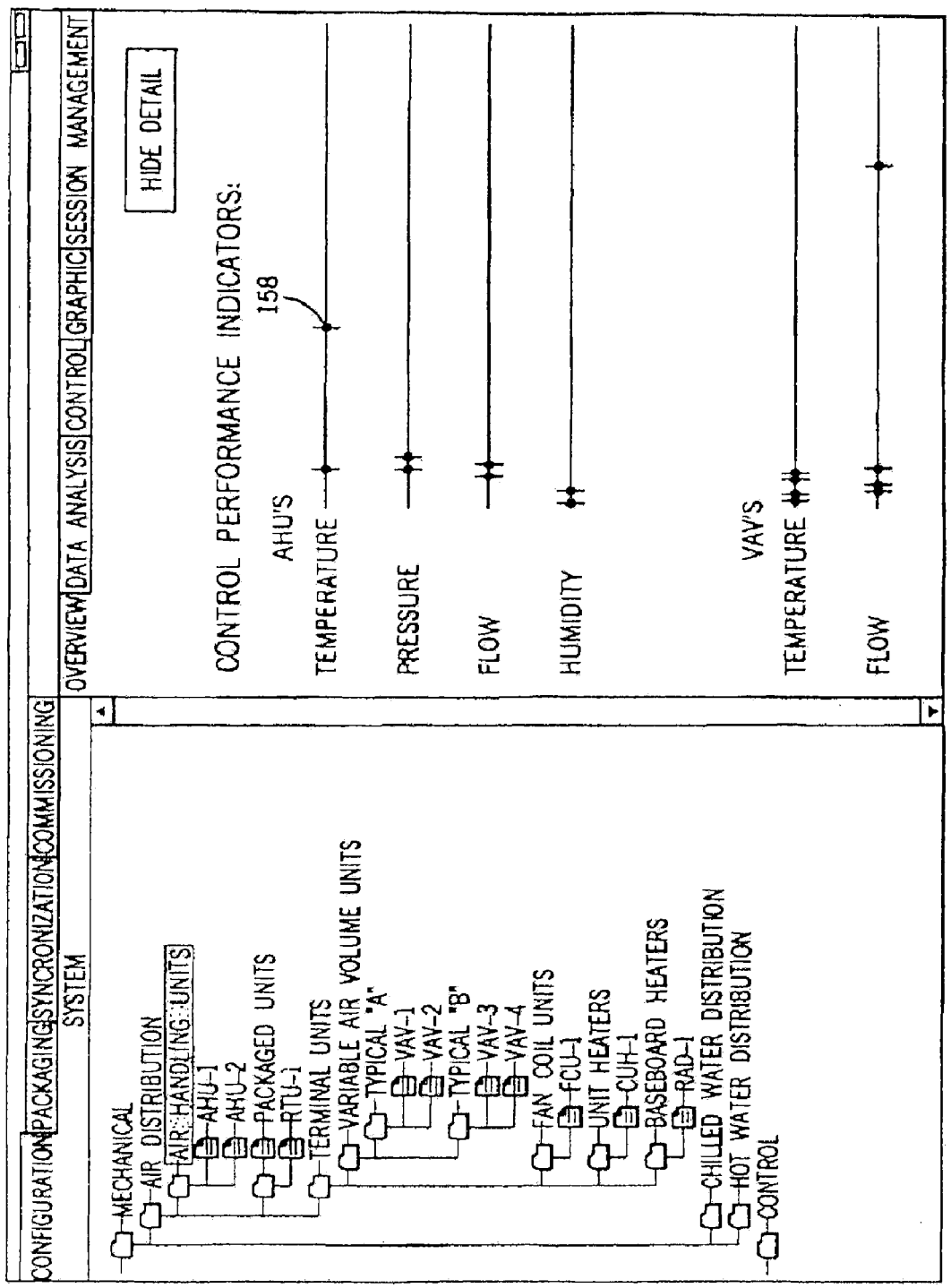

When poorly performing systems are identified, the user is able to drill down on the poorly performing systems using the illustrated apparatus to discover additional details that may assist the user with diagnosing the root cause of the poor performance. For example, FIG. 9 shows a first level of drill down by system type in a report 156. Report 156 shows the performance of HVAC control loops within each of the systems types. This level of drill down allows the user to identify the specific kind of problem a system is having.

Figure 10:
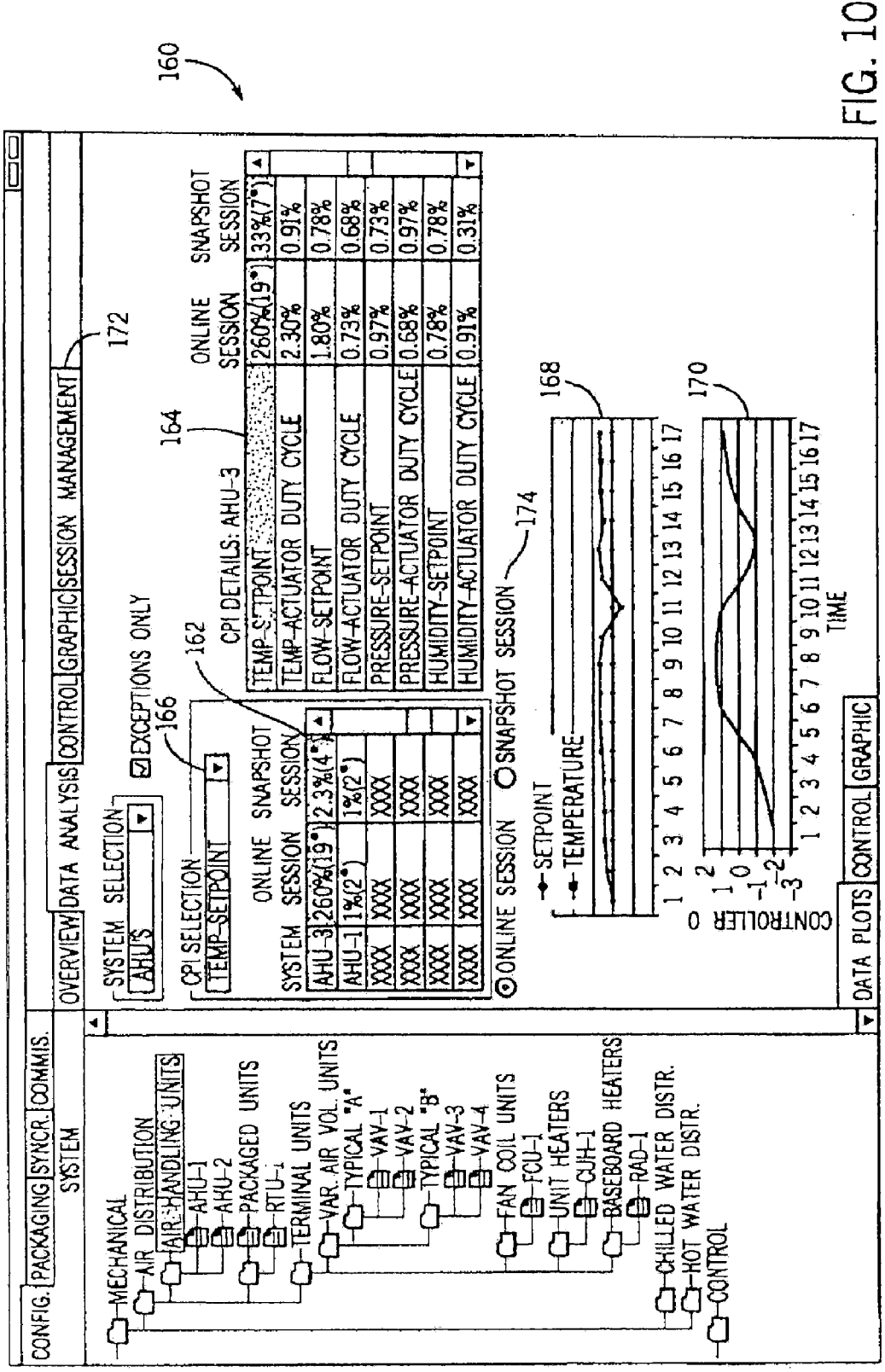

After the control loop having the problem is identified (e.g., the temperature control loop indicated by data point 158 in FIG. 9), the user is able to zoom in on the performance of the individual control loop using a report 160 (see FIG. 10). According to an exemplary embodiment, report 160 displays enough trend data or historical sensor information to allow problems with the performance to be diagnosed. In the illustrated embodiment, report 160 includes tables 162 and 164 which display performance data for the control loops. According to an exemplary embodiment, the user can select a row in table 162 to cause table 164 to provide the detailed information for the control loop associated with the air handling unit of the selected row in table 162 and a drop down menu 166. At the same time, a pair of graphs 168 and 170 display actual values (both historical and current) from a trend buffer for the selected control loop which may allow the user to visually identify performance problems. For example, in a temperature control loop for AHU-3 there is an input (TEMPERATURE), a set point, and an output (CONTROLLER OUTPUT). Thus, all three of such values can be plotted in graphs 168 and 170 to help the user diagnose the problem.

According to an exemplary embodiment, the data in the trend buffer along with any other gathered historical data and/or performance indicators may be stored for future reference in a database or other memory by clicking on a session management tab 172 and activating a save feature. In addition, a snapshot session checkbox 174 may be provided to allow any previously saved session data to be redisplayed in tables 162 and 164 and in graphs 168 and 170.

Figure 11:
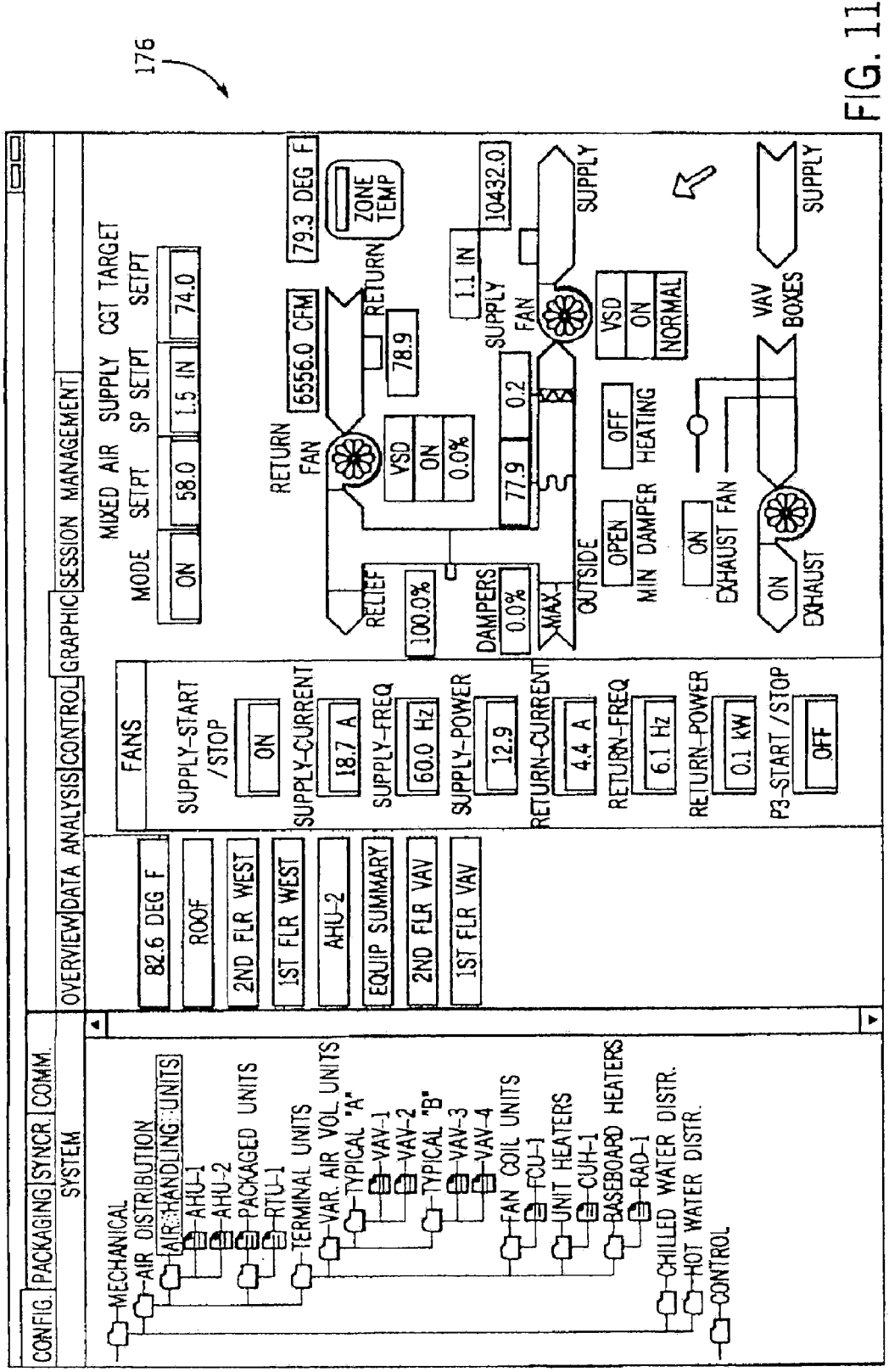
FIGS. 11 and 12 illustrate tools that may be used to inspect and alter values and control logic associated with controlled devices in an environmental control network.
Figure 12:
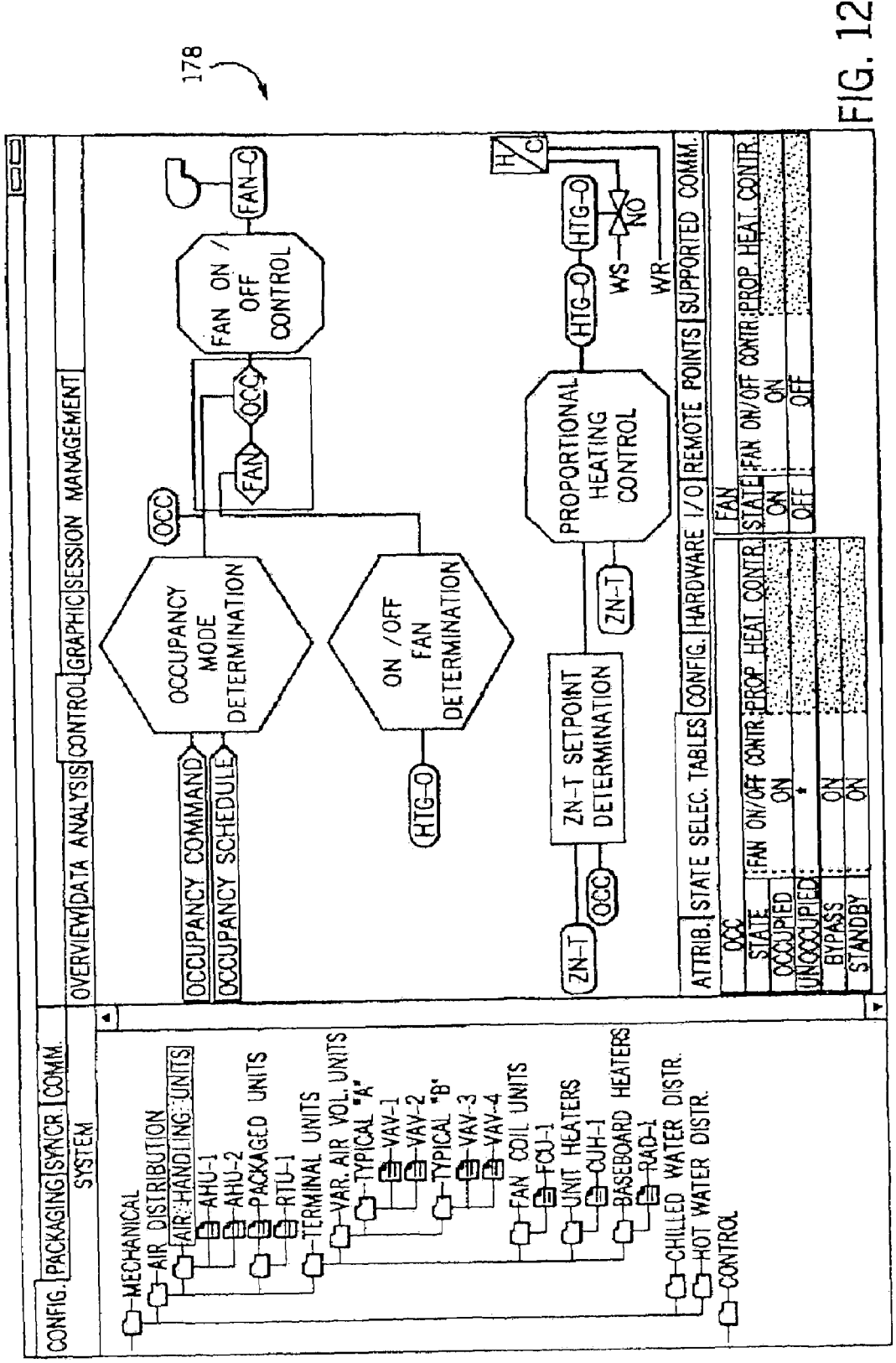

Turning now to FIGS. 11 and 12, two final tools for assessing performance and diagnosing problems in a facility management system are provided. FIG. 11 displays a hardware (or mechanical) system layout view 176 for the selected system. View 176 provides a simplified view of the selected system (at a device level detail) and the values presently on that system based on the graphic. Using view 176, it is possible to not only inspect values in the system but also to override and change the values. This can be invaluable in assisting building operators with diagnosing problems noted in higher level performance views of the system.

FIG. 12 shows a control diagram view 178 which illustrates the control strategy used for the selected system (e.g., volume matching vs. building static pressure control for the return fan). View 178 may be used for many purposes that might benefit building operators such as verifying sequence of operation, creating building wide control strategies (e.g., optimal start, power-fail, motor restart), and the like. View 178 may also be used to override values (either temporarily or permanently) to perform testing and/or diagnosis of problems.

Figure 13:
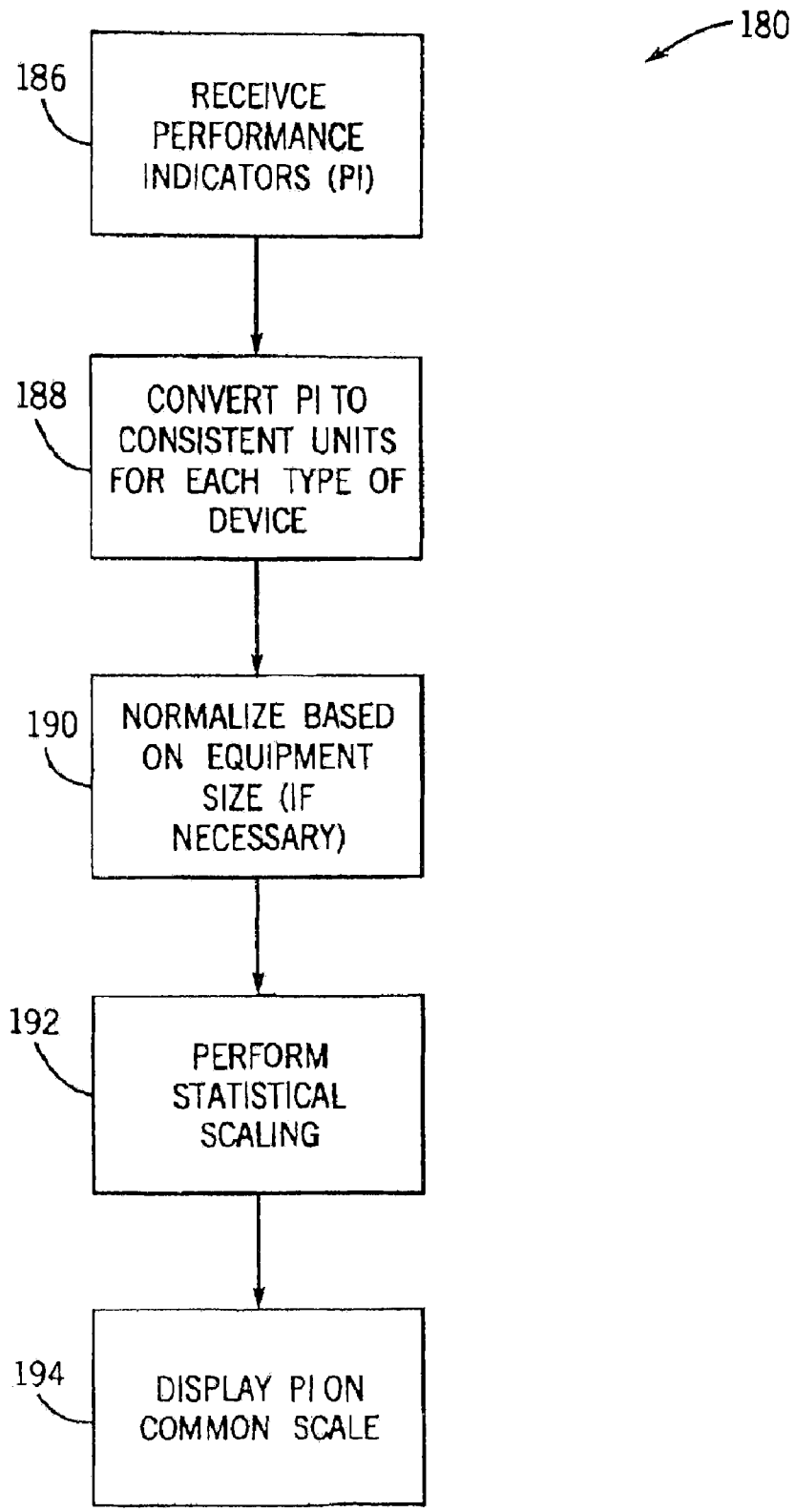
FIG. 13 illustrates a flowchart of an exemplary embodiment of a method for generating a standardized/normalized/scaled performance graph.

Turning now to FIG. 13, an exemplary embodiment of a method 180 for creating a normalized/scaled performance view is illustrated and described. According to method 180, performance indicators ("PI") are received in a step 186 for one or more control applications.

After the performance indicators are received, the performance indicators are converted in a step 188 into consistent units for each type of control application. For example, the airflow through one VAV box may be measured in cubic feet per minute (CFM) while in another VAV box it is measured in cubic feet per second.

Next, the standardized performance indicators may be normalized based on the equipment size in a step 190. Normalization step 190 need only be performed in certain instances, e.g., for volumetric or mass flow rates. For example, it may be necessary to normalize flow errors in a VAV box because an error of 100 CFM is a large error for a box with a maximum capacity of 200 CFM but a small error for a box with a maximum capacity of 100,000 CFM. Examples of volumetric flow rates performance indices that might benefit from normalization include (1) the absolute value of flow error through a VAV box and (2) the absolute value of return flow error for volume matching. An exemplary method for normalizing such flow rates for volumetric flow rate is to divide the performance index by the design or maximum capacity. For example, if a VAV box has a control performance index for the absolute value of the flow error of 100 CFM and the maximum capacity of the box is 1,000 CFM, then a normalized performance index may be 0.1 (i.e., 100 CFM/1,000 CFM). Other types of performance indices besides volumetric or mass flow rates may also require and/or benefit from normalization. Examples of performance indices that typically need not be normalized include pressure, temperature, humidity, velocity, and the like.

After obtaining standardizing and normalizing (where necessary or helpful) the performance indices, a statistical scaling is performed in a step 192 and then the performance indicators are displayed on a common scale (step 194). A known method for performing such statistical scaling involves determining the standard deviation (z-value) for each performance index, which is disclosed in commonly-owned U.S. Pat. No. 7,031,880. The standard deviation score is a measure in standard deviations of how far a sample is from the mean. However, the standard score method may find less utility for control systems that use on-off control or staged control outputs.

Figure 14:
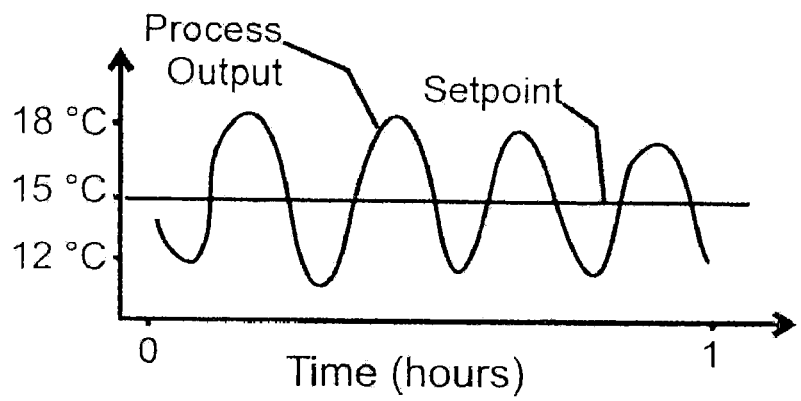
FIGS. 14-18 illustrate process outputs for environmental control systems.
Figure 15:
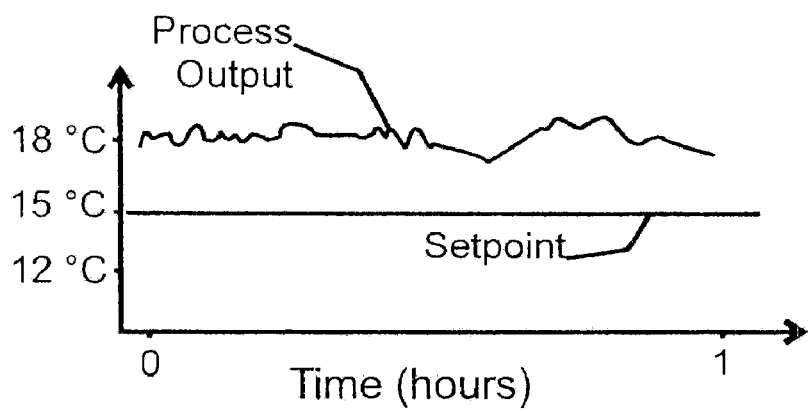

Other exemplary methods find greater utility because typically no assumptions are employed about the distribution of correctly operating systems. For example, for fault-free operation of on-off control systems, the system's process output will oscillate around a setpoint, as shown in FIG. 14. Also, for faulty operation with on-off control systems, the system's process output will have a persistent offset, as shown in FIG. 15. For on-off control systems, the integral of the error is used to characterize the control performance. The standard score can be determined for the integral of the error. However, in the case of an on-off control system, a poor performing system have either a large positive or negative standard score. Also, the distribution of performance indicators for fault-free systems is normally distributed. Therefore, an exemplary method for comparing the performance of control systems with staged outputs (or on-off) versus proportional outputs is preferably employed. The exemplary method enables both types of control systems to be compared on the same scale and minimizes mathematical assumptions about distribution of fault-free control systems.

On-off control systems (i.e., staged control systems) include a simple control strategy configured to turn on and off a device. For example, an on-off control strategy may control a heating or air-conditioning system. A simple on-off control strategy may turn on the heating system when the temperature is below the setpoint and turn off the heating system when the temperature is above the setpoint. For an air-conditioning system that is configured to provide cooling, an on-off control system is configured to turn on the air-conditioning system when the temperature was above the setpoint and turn off when the temperature was below the setpoint. With an on-off control strategy, the control system process output will oscillate around the setpoint. In such cases, an exponential weighed moving average (EWMA) of the error is used to assess the control performance of on-off control strategies. The exponential weighted moving average of the error at time t is determined by:

$$\bar{e}_t = \bar{e}_{t-1} + \lambda(e_t - \bar{e}_{t-1})$$

where $\lambda$ is a smoothing constant, $e_t$ is the error at time t and $\bar{e}_{t-1}$ is the exponential weighted moving average of the error at time t−1. For fault-free control systems, the value of $\bar{e}_t$ should be near zero and faulty systems will have large negative or positive values. For control performance monitoring, the smoothing constant is selected between the following limits:

$$\frac{T}{20 t_s} < \lambda < \frac{T}{5 t_s}$$

For proportional output control systems, the control output may be modulated in a number of steps, for example, $2^8$ steps in moving the actuator. Then, for a well tuned control system, the process output should be near the setpoint. For a modulating output, both the integral of the error and the integral of the absolute value of the error can be used to characterize the control performance. The exponentially weighted moving average of the integral of the absolute value of the error is determined by:

$$\overline{|e_t|} = \overline{|e_{t-1}|} + \lambda(|e_t| - \overline{|e_{t-1}|})$$

Figure 16:
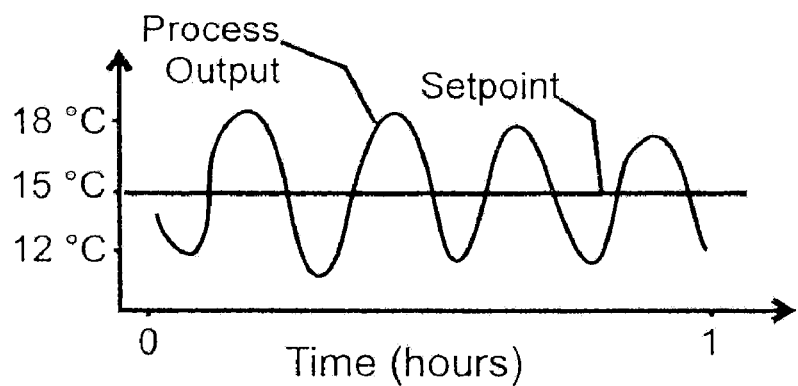
Figure 17:
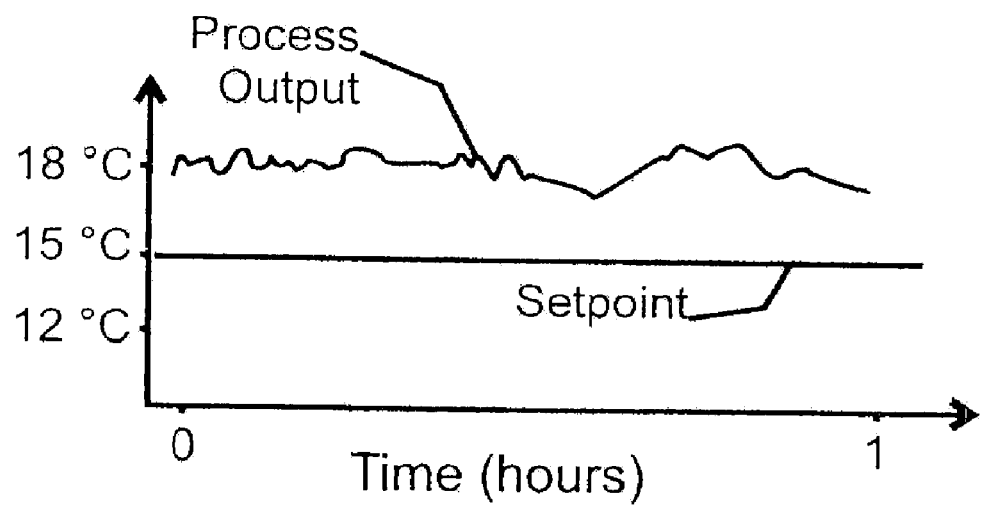
Figure 18:
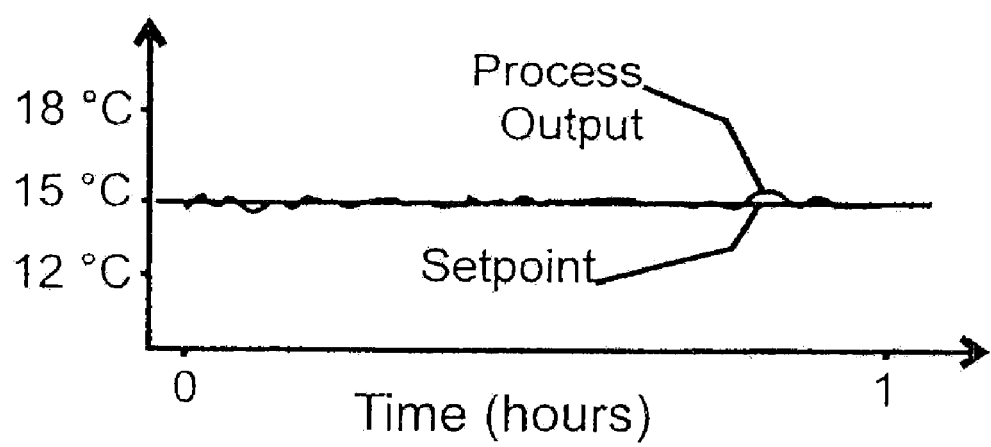

For faulty systems, the integral of the absolute value of the error will have large positive values. Referring to FIGS. 16 and 17, faulty operation for a controller with a modulating output is shown. Referring also to FIG. 18, the process output and setpoint for fault-free operation of a control system with a modulating output is also shown.

For on-off control systems and proportional output control systems, an exponential weighed moving average (EWMA) of the performance indicator is used to assess the control performance of the control systems. As mentioned above, the two performance indicators for faulty systems are $\bar{e}_t$ and $\overline{|e_t|}$, wherein $\bar{e}_t$ is employed to assess the performance of an on-off control system and $\overline{|e_t|}$ is used to assess the performance of a proportional output system. Faulty systems for $\bar{e}_t$ (on-off controls) typically have either large positive or negative values, and faulty systems for $\overline{|e_t|}$ (proportional output controls) typically have large positive values.

Figure 19:
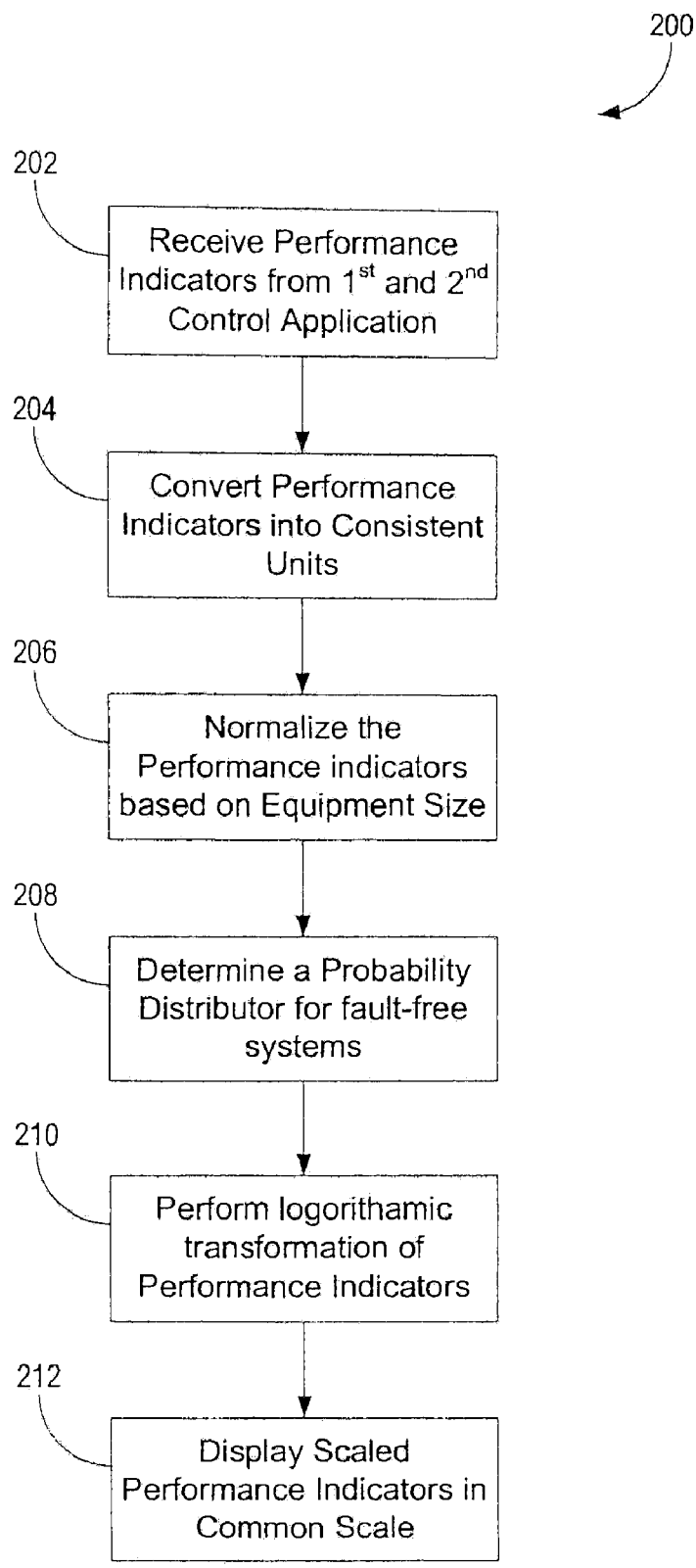
FIG. 19 illustrates a flowchart of an exemplary embodiment of a method for generating a standardized/normalized/scaled performance graph.

Turning now to FIG. 19, an exemplary embodiment of a method for transforming the performance indicators is shown and described. According to the method, the performance indicators are received from a first control application (step 202), wherein the first control application includes a modulating control output. The performance indicators are also received from a second control application (step 202), wherein the second control application includes a staged-control output. After the performance indicators are received, the performance indicators may be further converted based on the type of control application (step 204) and then normalized based on the equipment size, as previously described and as shown at step 206.

Figure 20:
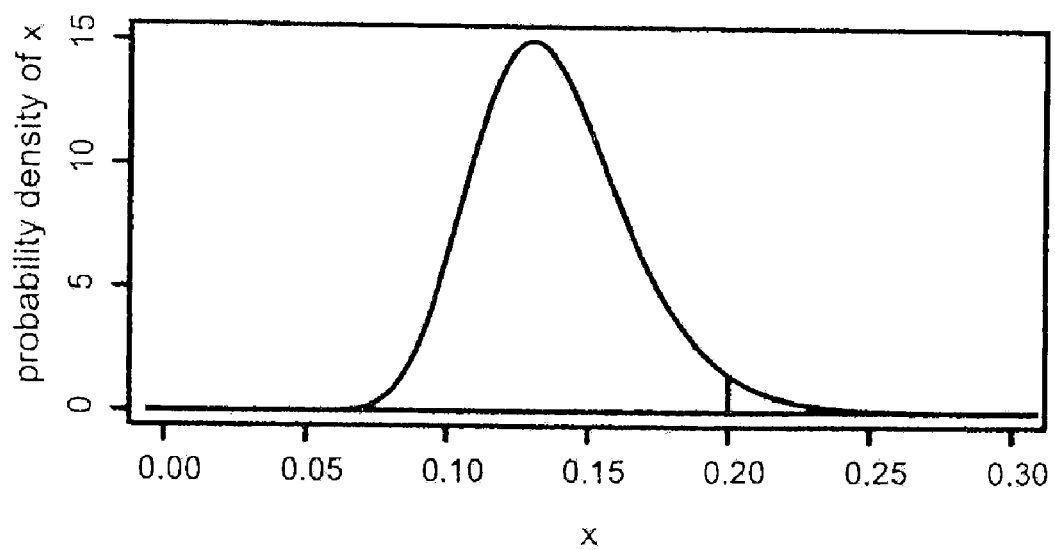
FIGS. 20-21 illustrate probability density functions of performance indicators of environmental control systems.

After standardizing and normalizing the performance indicators, a determination of the probability distribution is made for a fault-free environmental control system (step 208). Next, a statistical scaling is performed by calculating probability distributions associated with the performance indicators of the first and second control applications. The statistical scaling further includes performing a logarithmic transformation of the performance indicators (step 210). For performance indicators of a proportional output control system (i.e., systems with faults for on the right hand tail of the probability distribution and large values of $|\bar{e}_t|$), the performance indicator $x_1$ may be transformed by:

$$\tilde{x}_1 = \log_{10}\left(\frac{1}{Pr[X > x_1]}\right)$$

where X is a random sampling from the probability distribution for fault-free systems and $Pr[X > x_1]$ is the probability that X is greater than to $x_1$. Referring to FIG. 20, the probability density function for performance indicators that have faults for large positive values is shown. The region under the curve, greater than 0.20, exhibits the probability that the performance indicator is greater than 0.2, (e.g., $Pr[X > 0.2]$).

For performance indicators of an on-off control system (i.e., systems with faults for both large and small extreme values of the probability distribution), the performance indicator $x_2$ may be transformed by:

$$\tilde{x}_2 = \begin{cases} \log_{10}\left(\frac{1}{Pr[X < 2E(x) - x_2] + Pr[X > x_2]}\right) & \text{if } x_2 > E(X) \\ \log_{10}\left(\frac{1}{Pr[X < x_2] + Pr[X > 2E(X) - x_2]}\right) & \text{if } x_2 \le E(X) \end{cases}$$

where X is a random sampling from the probability distribution for fault-free systems, E(X) is the expected value of X, and $Pr[X > x_2]$ is the probability that X is greater than $x_2$. When the fault-free distribution has an expected value of 0 (e.g., E(X)=0), the transformation scaling may be simplified to:

$$\tilde{x}_2 = \begin{cases} \log_{10}\left(\frac{1}{Pr[X < -x_2] + Pr[X > x_2]}\right) & \text{if } x_2 > 0 \\ \log_{10}\left(\frac{1}{Pr[X < x_2] + Pr[X > -x_2]}\right) & \text{if } x_2 \le 0 \end{cases}$$

In the case of the fault-free distribution being symmetric, then the transformation scaling may be further simplified to:

$$\tilde{x}_2 = \begin{cases} \log_{10}\left(\frac{1}{2Pr[X > x_2]}\right) & \text{if } x_2 > 0 \\ \log_{10}\left(\frac{1}{2Pr[X < x_2]}\right) & \text{if } x_2 \leq 0 \end{cases}$$

Figure 21:
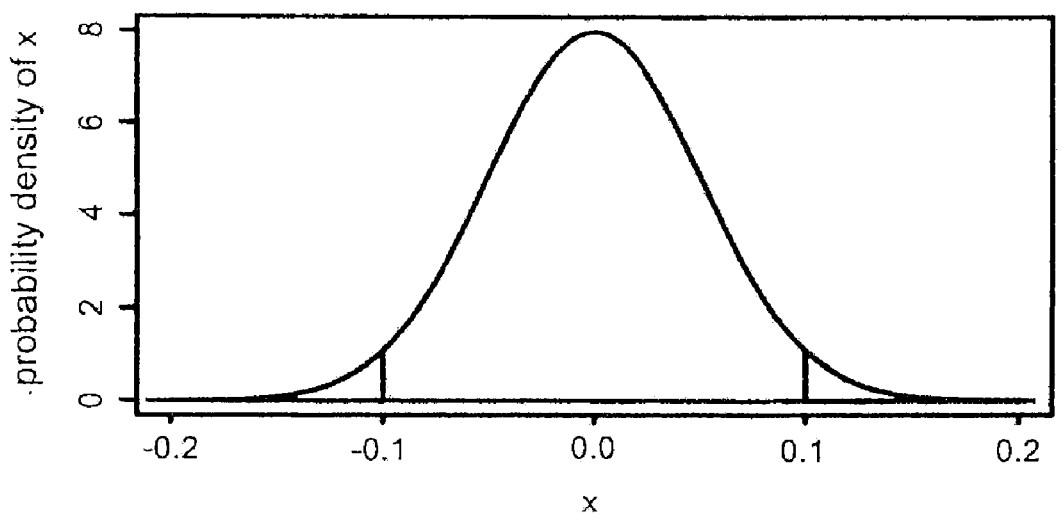

Referring to FIG. 21, the probability density function for performance indicators that have faults for extreme values (i.e., small or large values) is shown. The regions under the curve, less than −0.1 and greater than 0.1, equal the probability that the performance indicator is less than −0.1 plus the probability that the performance indicator is greater than 0.1 (e.g., Pr[X<−0.1]+Pr[X>0.1]), as shown in FIG. 21.

Figure 22:
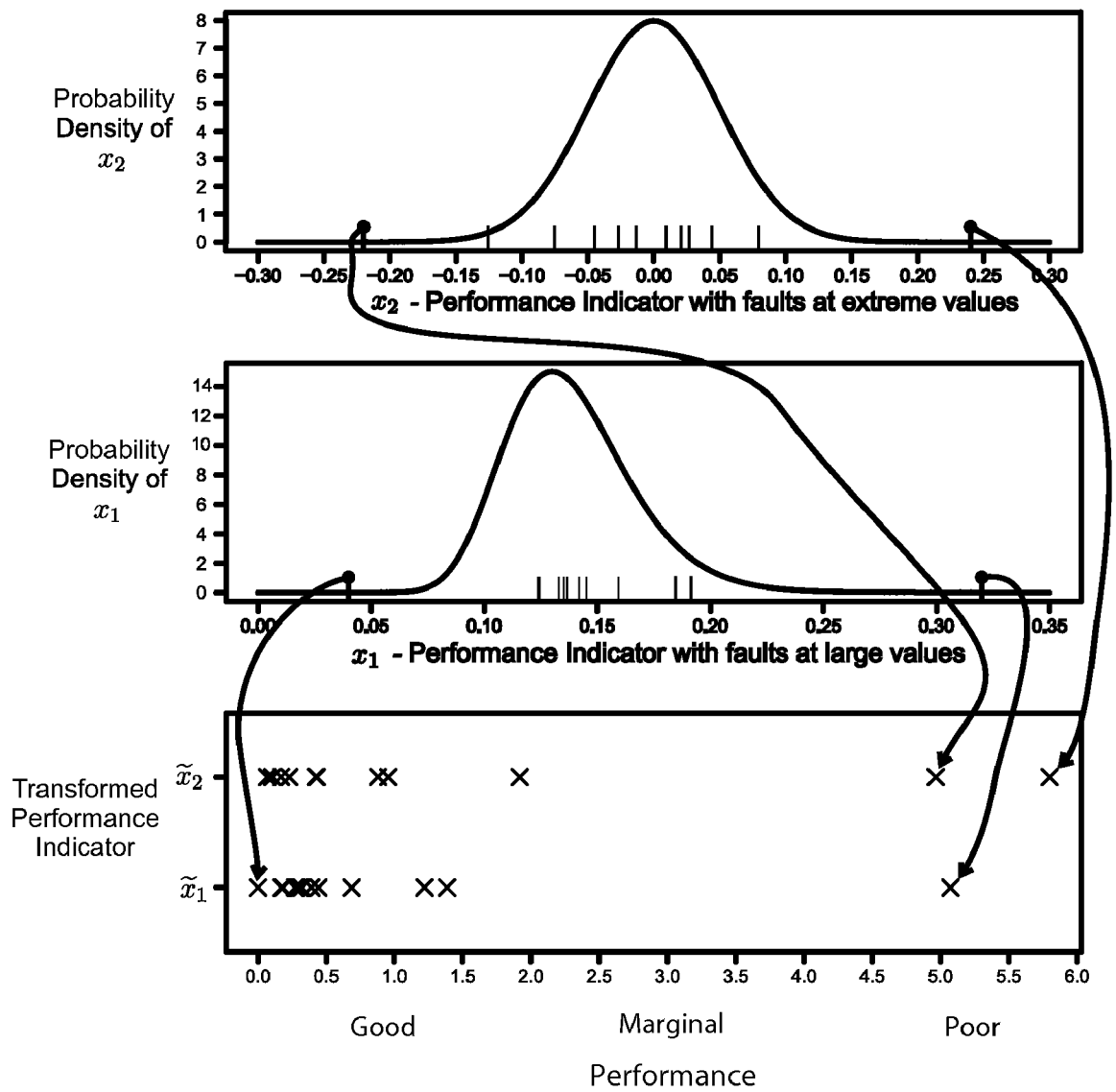
FIG. 22 illustrates a plot of performance indices plotted on a common scale.

In the illustrated embodiment in FIG. 19, method 200 concludes with a final step 212 of displaying each standardized/normalized/scaled PI on a common scale. One example of a common scale is shown in FIG. 22. FIG. 22 shows a rugplot of at least twelve (12) samples for each distribution, including the probability density functions of the fault-free data and rugplots of the transformed performance indicators. The uppermost graph (shown as Probability Density of $x_2$) exhibits the probability density function for the performance indicators with faults at both tails and the corresponding rugplot. As shown in the Transformed Performance Indicator chart, the upper and lower extreme values are transformed into performance indicators that show poor performance. The middle graph (shown as Probability Density of $x_1$) is a similar graph for a performance indicator with faults for large values. The lower extreme performance indicator is transformed into a region of good performance and the upper extreme performance indicator is transformed into a region of poor performance, as shown in the Transformed Performance Indicator chart. Also, other types of common scales are well known to persons skilled in the art and could also be utilized.

As persons skilled in the art will appreciate, the forgoing methods, apparatuses and tools enable central management of the performance of building control systems and equipment across the breadths of the enterprises. Moreover, the foregoing methods and apparatuses apply not only to HVAC systems (e.g., chillers, boilers, air handlers), but also to other types of controlled systems. It should be understood that, while the detailed drawings and specific examples given describe exemplary embodiments of the present invention, they are for the purpose of illustration only. The invention is not limited to the precise details and conditions disclosed. For example, although the forgoing exemplary embodiments were described more thoroughly in the context of an HVAC system than other types of environmental control systems, the concepts of the present invention are equally applicable to numerous other types of systems including but not limited to lighting, utilities, spaces, fire and safety, power and the like. Also, although particular facility management systems and components are suggested, the performance monitoring and diagnostic system may be configured for various other HVAC systems. In addition, the system may easily be configured to analyze other performance indicators than those specifically described or mentioned above. Accordingly, these and all other such modifications are intended to be included within the scope of the present invention. Other substitutions, modifications, changes and omissions may be made in the design, operating conditions and arrangement of the exemplary embodiments without departing from the spirit of the present system and method.

What is claimed is:

1. A system for displaying, on an electronic display device, scaled performance indicators of control applications in an environmental control system, the system comprising:
a memory device configured to receive and store more than one performance indicator from a first control application, wherein the first control application includes a modulating control output to control a first device of the environmental control system, wherein the memory device is further configured to receive and store more than one performance indicator from a second control application, wherein the second control application includes a staged-control output to control a second device for the environmental control system; and
computing electronics configured to identify a probability distribution function, wherein the probability distribution function is characteristic of a fault-free environmental control system, wherein the computing electronics are further configured to retrieve the performance indicators of the first and second control applications from the memory device and to calculate and store probability distributions associated with the performance indicators of the first and second control applications in the memory device, wherein the calculation is based on the identified probability distribution function, wherein the computing electronics are further configured to calculate a graphical representation of the probability distributions associated with the first and second control applications and to cause the display, on the electronic display device, of the graphical representation of the probability distributions on a common scale.

2. The system of claim 1, wherein calculating the probability distributions includes performing a logarithmic transformation of the performance indicators.

3. The system of claim 2, wherein the logarithmic transformation for the first control application is given by:

$$x_1 = \log_{10}\left(\frac{1}{Pr[X > x_1]}\right)$$

where X is a random sampling generated from the identified probability distribution function for fault-free systems and Pr[X>$x_1$] is the probability that X is greater than $x_1$.

4. The system of claim 2, wherein the logarithmic transformation for the second control application is given by:

$$x_2 = \begin{cases} \log_{10}\left(\frac{1}{Pr[X < 2E(x) - x_2] + Pr[X > x_2]}\right) & \text{if } x_2 > E(X) \\ \log_{10}\left(\frac{1}{Pr[X < x_2] + Pr[X > 2E(X) - x_2]}\right) & \text{if } x_2 \leq E(X) \end{cases}$$

where X is a random sampling generated from the identified probability distribution function for the fault-free environmental control system, E(X) is the expected value of X, and Pr[X>$x_2$] is the probability that X is greater than $x_2$.

5. The system of claim 1, wherein the probability distribution function comprises a sample mean and standard deviation function.

6. The system of claim 1, wherein the probability distribution function comprises a kernel density function.

7. The system of claim 1, wherein the probability distribution function comprises a moments function.

8. The system of claim 1, wherein the performance indicators are exponentially weighted moving averages.

9. The system of claim 1, wherein the common scale comprises a plurality of dot plots ranging from good to poor performance.

10. The system of claim 1, wherein the control applications are associated with an HVAC system.

11. The system of claim 1, wherein the performance indicators represent error in the performance of the control applications.

12. A computerized method for analyzing performance of control applications in an environmental control system, the steps of the method comprising:
  receiving more than one performance indicator from a first and a second control application of the environmental control system at computing electronics;
  identifying, using the computing electronics, a probability distribution function characteristic of a fault-free environmental control system;
  scaling, by the computing electronics, the performance indicators from the first and second control applications based on the identified probability distribution function characteristic of a fault-free environmental control system;
  determining, at the computing electronics, probability distributions associated with the scaled performance indicators of the first and second control applications; and
  displaying, on an electronic display system, the probability distributions of the first and second control applications on a common scale.

13. A method for analyzing performance of control applications according to claim 12, wherein the common scale comprises a plurality of dot plots ranging from good to poor performance.

14. A method for analyzing performance of control applications according to claim 12, wherein the step of displaying the probability distributions includes displaying on a rug plot.

15. A method for analyzing performance of control applications according to claim 12, wherein the performance indicators are exponentially weighted moving averages.

16. A method for analyzing performance of control applications according to claim 12, wherein the performance indicators represent error in the performance of the control applications.

17. A method for analyzing performance of control applications according to claim 12, wherein the control applications are associated with an HVAC system.

18. A method for analyzing performance of control applications according to claim 12, further including performing a logarithmic transformation of the performance indicators.

19. A method for analyzing performance of control applications according to claim 18, wherein the logarithmic transformation for the first control application is given by:

$$x_1 = \log_{10}\left(\frac{1}{Pr[X > x_1]}\right)$$

where X is a random sampling from the probability distribution for the fault-free environmental control system and $Pr[X > x_1]$ is the probability that X is greater than $x_1$.

20. A method for analyzing performance of control applications according to claim 18, wherein the logarithmic transformation for the second control application is given by:

$$x_2 = \begin{cases} \log_{10}\left(\frac{1}{Pr[X < 2E(x) - x_2] + Pr[X > x_2]}\right) & \text{if } x_2 > E(X) \\ \log_{10}\left(\frac{1}{Pr[X < x_2] + Pr[X > 2E(X) - x_2]}\right) & \text{if } x_2 \leq E(X) \end{cases}$$

where X is a random sampling from the probability distribution for the fault-free environmental control system, E(X) is the expected value of X, and $Pr[X > x_2]$ is the probability that X is greater than $x_2$.

21. A method for analyzing performance of control applications according to claim 12, wherein determining probability distributions associated with the performance indicators of the first and second control applications comprises utilizing a sample mean and standard deviation function.

22. A method for analyzing performance of control applications according to claim 12, wherein determining probability distributions associated with the performance indicators of the first and second control applications comprises utilizing a kernel density function.

23. A method for analyzing performance of control applications according to claim 12, wherein determining probability distributions associated with the performance indicators of the first and second control applications comprises utilizing a moments function.

* * * * *